(12) United States Patent
Clements

(10) Patent No.: US 10,691,397 B1
(45) Date of Patent: Jun. 23, 2020

(54) MOBILE COMPUTING DEVICE USED TO OPERATE DIFFERENT EXTERNAL DEVICES

(71) Applicant: Sigmund lindsay Clements, Montreal (CA)

(72) Inventor: Sigmund lindsay Clements, Montreal (CA)

( * ) Notice: Subject to any disclaimer, the term of this patent is extended or adjusted under 35 U.S.C. 154(b) by 466 days.

(21) Appl. No.: 14/634,788

(22) Filed: Feb. 28, 2015

Related U.S. Application Data

(63) Continuation-in-part of application No. 14/258,013, filed on Apr. 22, 2014, now Pat. No. 9,477,317.

(51) Int. Cl.
*G06F 3/14* (2006.01)
*G06F 3/01* (2006.01)
*G06F 3/0481* (2013.01)
*G06F 3/0482* (2013.01)
*G06F 3/0484* (2013.01)
(Continued)

(52) U.S. Cl.
CPC ............ *G06F 3/1454* (2013.01); *G06F 3/017* (2013.01); *G06F 3/0482* (2013.01); *G06F 3/0484* (2013.01); *G06F 3/0488* (2013.01); *G06F 3/04817* (2013.01); *G06F 3/04842* (2013.01); *G09G 5/12* (2013.01); *G09G 2354/00* (2013.01); *G09G 2370/06* (2013.01); *G09G 2370/16* (2013.01)

(58) Field of Classification Search
CPC .. G06F 3/1454; G06F 3/0484; G06F 3/04817; G06F 3/0482; G06F 3/04842; G06F 3/017; G06F 3/0488; G09G 5/12; G09G 2354/00; G09G 2370/16; G09G 2370/06
See application file for complete search history.

(56) References Cited

U.S. PATENT DOCUMENTS 7,274,290 B2 * 9/2007 Morita ................ G06F 19/3406
340/539.1
7,730,223 B1 * 6/2010 Bavor ................... G06F 3/0481
709/223

(Continued)

OTHER PUBLICATIONS

U.S. Appl. No. 14/258,013, filed Apr. 22, 2014, sigmund clements.
(Continued)

*Primary Examiner* — Michael C Zarroli

(57) ABSTRACT

A mobile device is used to operate, different external devices. The mobile device may include a phone, smart watch, and smart glasses. The mobile device searches for, the broadcasting of the external devices operating control panel. When the mobile device is in the vicinity, of one of the external devices, the mobile device, automatically connects to and communicates, with the external device. The device's operating control panel is downloaded to the mobile device. The panel is shown on the mobile device's display. The user operates the external device, by inputting into the shown control panel. Different devices can be operated by phone, such as, elevators, and room lights, etc. The mobile device reduces the transference of bacteria to a user, by reducing touch input into multiuser displays. Pre-set external device settings can be stored on the mobile device, and can be automatically downloaded to the associated external device.

20 Claims, 21 Drawing Sheets

(51) Int. Cl.
*G06F 3/0488* (2013.01)
*G09G 5/12* (2006.01)

(56) References Cited

U.S. PATENT DOCUMENTS

| | | | | |
|---|---|---|---|---|
| 8,893,320 | B2* | 11/2014 | Klicpera | 4/601 |
| 9,176,703 | B2* | 11/2015 | Kim | G06F 3/1446 |
| 9,222,239 | B2* | 12/2015 | Hartwick | E02F 5/06 |
| 9,313,865 | B2* | 4/2016 | Ogawa | H05B 37/0272 |
| 9,354,798 | B2* | 5/2016 | Sasaki | G08C 17/00 |
| 9,462,041 | B1* | 10/2016 | Hagins | H04L 67/10 |
| 9,477,317 | B1* | 10/2016 | Clements | G06F 3/017 |
| 2002/0007510 | A1* | 1/2002 | Mann | E03C 1/057 |
| | | | | 4/300 |
| 2010/0023865 | A1* | 1/2010 | Fulker | G06F 3/04817 |
| | | | | 715/734 |
| 2011/0208541 | A1* | 8/2011 | Wilson | A61G 7/018 |
| | | | | 705/3 |
| 2012/0113223 | A1 | 5/2012 | Hilliges | |
| 2013/0068832 | A1* | 3/2013 | Li | H05B 37/0272 |
| | | | | 235/375 |
| 2014/0009394 | A1* | 1/2014 | Lee | H04N 5/4403 |
| | | | | 345/157 |
| 2014/0111479 | A1 | 4/2014 | Krah | |
| 2014/0325048 | A1* | 10/2014 | Benchorin | G06F 3/1292 |
| | | | | 709/223 |
| 2015/0000025 | A1* | 1/2015 | Clements | G06F 3/013 |
| | | | | 4/443 |
| 2015/0000026 | A1 | 1/2015 | Clements | |
| 2015/0128050 | A1* | 5/2015 | Cormican | H04N 21/4143 |
| | | | | 715/734 |
| 2016/0117076 | A1* | 4/2016 | Kim | G06F 3/0488 |
| | | | | 715/735 |
| 2016/0360344 | A1* | 12/2016 | Shim | G06F 3/04817 |
| 2017/0019268 | A1* | 1/2017 | Lieberman | H04L 12/40 |

OTHER PUBLICATIONS

U.S. Appl. No. 14/585,187, filed Dec. 30, 2014, sigmund clements.
U.S. Appl. No. 14/258,013, sigmund clements.
U.S. Appl. No. 14/312,697, sigmund clements.
U.S. Appl. No. 14/512,359, sigmund clements.
U.S. Appl. No. 14/556,144, sigmund clements.
U.S. Appl. No. 14/585,187, sigmund clements.
U.S. Appl. No. 14/791,895, sigmund clements.

* cited by examiner

MOBILE COMPUTING DEVICE USED TO OPERATE DIFFERENT EXTERNAL DEVICES

CROSS REFERENCE TO RELATED APPLICATIONS

This application is a CIP of Ser. No. 14/258,013 filed 2014 Apr. 22, by the present inventor, which is incorporated by reference in its entirety.

SEQUENCE LISTING

None

BACK GROUND FIELD OF THE EMBODIMENT

This description relates to a smart phone, or mobile computing device, which is used to individually operate a plurality of differing external devices, specifically an improved way to interact with and operate differing individual external devices, with a mobile computing device.

BACK GROUND OF THE EMBODIMENTS

There are various ways to input data into a device, and or operate the device, without having to touch a surface which may have possible bacteria on it. Medical touch input devices may use a temporary plastic film over the input surface, that can be removed and replaced, before a new user touches the device's surface. Antibacterial hand lotion dispensers have become more present in public places to reduce the transmission of harmful bacteria and viruses, between people, and surfaces that people touch. People wear rubble gloves to reduce the transmission of germs, to their hands.

Infrared hand sensors are used to operate water faucets on sinks, toilet flushers, hand dryers, and door openers. In Hospitals motion sensing is used to open doors, so users don't have to touch surfaces that may contain germs, or to stop the user from leaving germs on the surface. Several types of hands free toilet seat rising and lowering devices have been proposed, for example, Baumoel in, U.S. Pat. No. 7,917,973 (2011) shows an infrared hands free system, for lifting and lowering a toilet seat.

Other systems can be used for germ avoidance. A smart phone uses a touch free capacitive field, to allow a user to interact with the phone while hovering above the display screen.

Phone camera eye-tracking uses the phones camera to lock onto the motion of the user's eyes. With eye-tracking, the phone can perceive where the user is looking, and can respond to a set of behaviors; such as, an intentional movement to scroll a web page up and down, or a long, purposeful blink to click.

A Kinect Sensor (trademark) made by the Microsoft Company interprets a user's body and hand gestures in mid-air to operate computer games. Two dimensional and three dimensional cameras and sensors, connected to computers, can be used for the mid-air, free air inputting of data. amera's can also be used for three dimensional 3D imagining, of a user's hand, to interpret mid-air hand gesture of the hand as input.

Mid-air gesture input which helps reduce the transmission of bacteria from touch screens, and retain the hygienic attribute of inputting data touch freely, suffer from disadvantages. A disadvantage may be the difficulty of judging a finger's distance from the device while mid-air touch inputting, which may lead to the finger touching the device. Many of the touch, and touch free devices heretofore known suffer from hygienic disadvantages.

Control panel device function activation buttons can become contaminated by germs, during user hand contact with the control buttons. The bacteria can be transmitted from the panel buttons to a person's hands. Bacteria and viruses on the hands may spread the to the person's mouth, to other surfaces, to other people, and to food. The spread of bacteria, increases the risk of food poisoning, and transfer of diseases.

Devices used in a house environment can be operated by a user's smart phone. The internet of things has been focused of the connection of devices to the internet. The connected devices can be monitored by other devices connected to the internet.

A smart toilet uses a smart phone as remote control, but the phone doesn't automatically operate on other smart toilets, or to other non-toilet devices, such as elevators.

Many people don't like to touch buttons, that have bacteria on them, such as, smart toilet remote control touch buttons. Multi user touch display input screens have the problem of accumulating germs. Some people may try to wrap toilet paper around their hand, before touching control panel buttons, to try to put an antibacterial barrier between the buttons and their hand. The toilet paper barrier is ineffective against bacteria, since bacteria can easily travel through toilet paper. People may try to use a piece of clothing, such as a part of a shirt sleeve as a barrier between the button and the hand, the shirt sleeve may act as a barrier; thought bacteria can attach to the user's shirt sleeve. Disposable rubber gloves may be effective against bacterial contamination, when touch inputting into a touch screen, though it may be inconvenient to carry and use rubber gloves.

Disadvantages

Many of the multiuser touch panel devices heretofore known suffer from disadvantages:

a) Bacteria and viruses can be transmitted to a user, who touches control panel buttons on a multiuser touch screen display.

b) A static electric discharge may be created as a user touches an input screen, which maybe be hazardous in flammable environments.

c) It may be the difficult to judge a finger's distance from an input device while mid-air touch inputting, which may lead to the finger inadvertently touching the device.

SUMMARY

Smart phone operation of differing devices, adds way to input into the individual device, as opposed to using the device's input buttons. Smart phone operation of multi user devices, adds another dimension of user interaction with the different devices, over their touch input touch screens. Smart phone operation of devices may be sanitarily beneficial for users of devices, operated by many users, in public and private settings.

Touching a user's individual smart phone display, may limit the spread of bacteria between users. Smart phone operation may afford a user, an anxiety free, state of mind, since the user, doesn't have to think about what was on the fingers of other user's, who touched control panel displays, before them. Differing devices can be operated by a phone, and may include, elevators, vending machines, and radios.

Flammable environments operation of touch input devices, may benefit from mobile device operation, due to the decrease in possible static electric discharge between a user's finger, and the mobile device touch input screen, when touch inputting into the screen. Since the mobile device has the same electric field as the user, static electricity is reduced between the user's finger and the input display, when the finger is contacting the display while inputting.

Many new possibilities may be explored with smart phone operation of differing devices.

Advantages

Some advantages of smart phone device activation, are bacteria and viruses, are unable to be transmitted to the user's hands, from the control panel. By limiting hand contact, with the bacteria and viruses that are on the panel, the transmission of bacteria and viruses to the hands, is substantially reduced. The smart phone lowers the amount of bacteria that is transmitted from the screen or buttons to hands, which lowers the amount of bacteria that is transmitted to the user's fingers. Lowering the amount of bacteria on the user's fingers, lowers the amount of bacteria transmitted from the fingers to the user's month.

By lowering the quantity of bacteria on the user's hands, the amount of bacteria traveling from the hands to food is lowered. Touch free interaction limits the bacteria on hands, which limits the amount of bacterial transmitted from hands to surfaces, and from hands to other people. Lowering the cross contamination of bacteria and viruses, from the control panel and to the user's hands, lessens people's exposure to food poisoning, and disease pathogens.

Smart phone operation of devices has advantages in work place environments. Work places may include food processing plants, restaurants using displays to operate smart toilets, and Hospitals. The mobile device may reduce the spread of anti-biotic resistant super bacteria, when used to operate hospital devices, such as, hospital elevators.

Smart phone operation maybe used in flammable environments to avoid static electric discharges, which may ignite flammable material. Mobile devices maybe used in space stations where static electric may be a problem caused by the dry air environment.

Some advantages of smart phone or other mobile device remote used to operate a device.

a) The mobile device display allows users to input into a device and avoid bacterial contamination.

b) The mobile device may be beneficial for people would rather avoid touching surfaces without possible bacteria on touch surfaces.

c) Users don't have to worry about what the person had on their fingers, who touched a multiuser control panel display before them.

d) Bacteria and viruses transmitted to a user's hands may be lessened, by the user not needing to touch multi display buttons, which may have bacteria and viruses on them.

The chance of a static electric discharge may be decreased by a user touch screen within the users own electric field. Reducing static electric discharge maybe be beneficial in hazardous flammable environments, and dry outer space station environments.

g) A mobile device input panel may aid disabled users by allowing users to active icons, without their fingers h) Smart phone operation may be used with many different devices, such as, a toilet remote control display, a vending machine display, a store credit card or debit payment machine display, a bank ATM display surface, a medical display surface, and elevator control panel.

The advantages of a mobile device used to operate differing electronic devices, without limitation, are an improved mobile device operation of differing devices.

Accordingly several advantages are to provide an improved smart phone's or other mobile device's operation of differing devices, as a means of providing a more sanitary, fun, and healthy experience, for a person. Still further advantages will become apparent from a study of the following description and the accompanying drawings. Various embodiments of mobile device operation of differing devices, allow a user to use the mobile device to operate differing devices. The capabilities of a mobile device's operation of differing devices, brings the future, of sanitary practices, device input diversity, and device input advances, to the present now.

DRAWINGS—FIGURES

Figure 2:
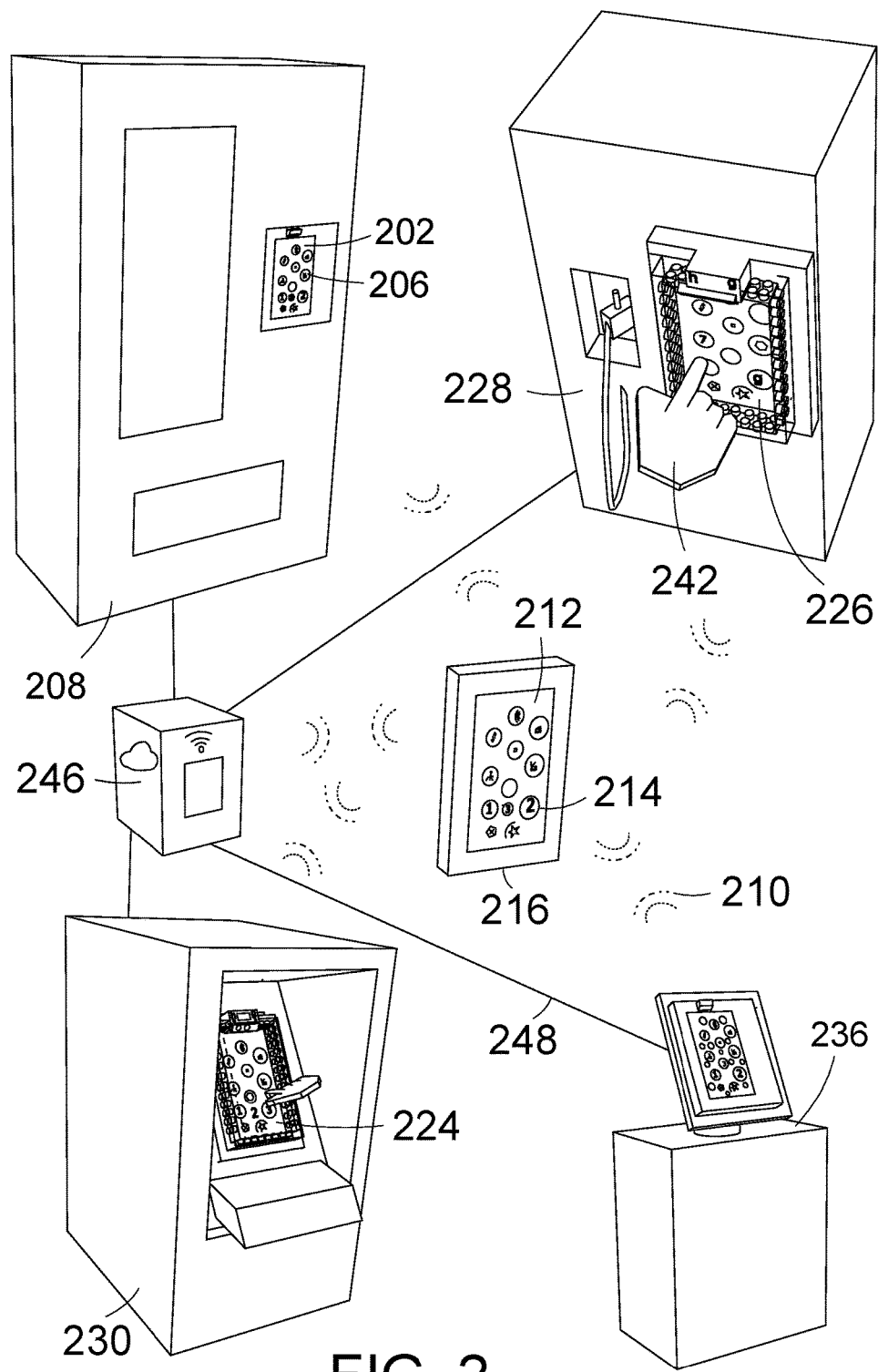
FIG. 2 shows a perspective view of a smart phone, a radio wave connection between the smart phone, and devices including, a vending machine, a gas pump, an automated teller machine, and a store checkout machine.

DRAWINGS REFERENCE NUMERALS 110 radio waves used for communicating
112 phone display
114 smart toilet operation icon
116 phone
118 flammable environment device icon
120 elevator control icon
126 internet router
128 wires connecting to router
132 elevator
134 smart toilet
136 flammable environment device
202 vending machine display
206 vending machine input icon
208 vending machine
210 radio waves used for communicating
212 portable computer display
214 operation icon
216 portable computer
224 automated teller machine ATM display
226 gas pump display
228 gas pump
230 automated teller machine
236 space station device
246 internet router
248 wires connecting to router
302 door lock
304 microwave oven
306 television
308 lighting device
310 radio waves used for communicating
312 phone display
314 operation icon
316 phone
326 internet router
328 wires connecting to router
402 car door lock
404 radio
406 build thermostat
408 laptop computer
410 radio waves used for communicating
412 phone display
414 operation icon
416 phone
426 internet router
428 wires connecting to router
510 radio waves used for communicating
512 phone display
514 operation icon
516 phone with stored device settings
532 elevator
534 smart toilet
536 store checkout station
538 computer server with stored device settings
538 internet router
540 wires connecting to router
604 vending machine
606 vending machine display
608 vending machine input icon
610 radio waves used for communicating
612 phone display
614 operation icon
616 phone
618 vending machine computer
620 vending machine transmitter
622 phone receiver
624 phone computer
626 phone transmitter
628 vending machine receiver
1232 elevator,
1234 smart toilet,
1236 store payment checkout machine,
1410 radio wave connection
1412 smart glasses
1414 brainwave for controlling eye glass display
1416 user
1432 elevator connectable to glasses
1434 smart toilet connectable to glasses
1436 user medical connectable to glasses
1502 avatar and touch input display,
1504 avatar and touch input display device,
1506 display icon 1508 vending machine,
1510 blue tooth radio waves,
1512 smart phone display,
1514 display icon,
1516 smart phone,
1518 smart watch display,
1520 display icon,
1524 smart watch,
1526 smart glasses display,
1528 display icon,
1530 smart glasses
1602 menu download distance
1604 vending machine
1606 vending machine display
1608 vending machine input icon
1610 radio waves used for communicating
1612 phone display
1614 operation icon
1616 phone
1618 vending machine computer
1620 vending machine transmitter
1622 phone receiver
1624 phone computer
1626 phone transmitter
1628 vending machine receiver
1630 internet router
1632 internet map 1640 wired connection to router
1704 vending machine
1706 vending machine display
1708 vending machine input icon
1710 radio waves used for communicating
1712 phone display
1714 operation icon
1716 phone
1718 vending machine computer
1720 vending machine transmitter
1722 phone receiver
1724 phone computer
1726 phone transmitter
1728 vending machine receiver
1730 internet router
1740 wired connection to router
1802 holographic glasses
1804 holographic glasses mid-air touch input display
1806 elevator input panel
1808 elevator
1810 user
1812 cursor
1814 holographic input icon
1816 cursor following hand movements
1910 user
1914 holographic input icon
1918 mid-air haptic touch shape
1920 transducer array
2010 user
2014 holographic image
2018 mid-air haptic touch shape
2020 transducer array
2022 camera First Embodiment A Space Station Device's Control Panel Downloaded to a Portable Computer Description and Operation A user's mobile computer, portable computer, smart phone, mobile device can communicate, and operate external devices. The mobile computing device, could be, a smart phone, a portable computer, a tablet, a smart watch, a google glass, and holographic glasses, as illustrated in FIG. 2. The external devices, may be, an elevator, a smart toilet, a vending machine, and an automated teller machine.

External devices broadcast their control panels, to mobile devices. The mobile device receives the broadcast when they are in range of the broadcast. The portable device receives the broadcast control panel, which is then displayed on the mobile devices display. If there is more than one external device shown on the display, the user can decide which external device they want to operate. The user operates the external device, by inputting into the external devices displayed control panel.

The mobile device's computer is connected to a display. When the user's mobile device 216 is near the external device. The external device's control panel icon is shown on the portable computer's display 212. The control panel icon indicates that the external device's control panel, is available for downloaded to the portable computer's display. When the external devices control display panel is activated, the external device's control panel is download to the mobile devices computer, and is shown on the display.

Many different external device's software, for the device's control panels, can download the to the mobile device's computer. The different devices which are available to be operated, can be shown on the display. The user can input which device they choose to operate. If another user is user is using the chosen device, the device would display that it is being used by another user. The device can notify the user when it is will be available to be operated, and when it is available for operation by the user.

The portable computer has a radio wave transmitter and a radio wave receiver connected to the portable computer's computer. The external devices each have radio wave transmitters and radio wave receivers, connected to the corresponding external device's computers. The portable computer can communicate with the external devices using, a communication link, such as, direct WIFI. The external devices have computers that communicate with the mobile device's computer.

The mobile device 216 may connect to and communicate to differing external devices, using a radio wave connection between the phone and the differing devices, and or an internet connection between the phone and the differing devices. The devices can connect to an internet router 246, the router can connect to the internet, using a wired 248 or radio wave 210 connection.

The different devices can connect to other devices, using a radio wave connection between the differing devices and or an internet connection between the differing devices. The mobile device can connect to other mobile device using radio waves and or the internet connection between the mobile devices.

The communication between the mobile device's computer and the computers in the external devices, may use, a computer language and a computer connection that allows the devices to communicate. A communication software programmed into the portable computer and external devices, which is compatible between the portable computer and external devices, is used for communication. The communication software enables the portable computer and external devices to communicate.

The mobile device computer and external devices uses standardized software enabling the communication between the mobile device computer and the external devices. The mobile device computer and devices use a universal software platform of software, and hardware, which allow the devices to communicate with the mobile device computer.

User activated icons correspond to functions, which operate the device 236. The user's touch input of the device's control panel, shown on the mobile device computer, is associated with the activation and operation of various functions of the device's operation.

A space station's devices could include a variety of devices, such as, a space station robotic operating arm control panel 236, etc., as illustrated in FIG. 2.

The user sees an icon on the mobile device's display, with a description of the device associated with the icon 214 which is available for operation. The user touch activates the icon with their finger. The activated icon shows a touch control panel menu. The menu of icons shows functions associated with operations of the device. The device that can be operated by touch activating icons of the menu. The user operates the device, using touch input of differing icons associated with functions of the displayed device's operating menu. The space device's display can also show the activity, being shown on the portable computer display, and vice versa.

The portable computer 216, can reduce the problem of static electricity in space, by decreasing the need to contact the panel face with a user's finger. The mobile device could also be used to operate differing devices in flammable environments to avoid igniting combustibles in the air, such as, dust particles environments in grain silos, flammable petroleum vapours environments in oil refineries, and paint factory flammable vapors environments.

User pre-set settings, can be downloaded to the space station device from the portable computer, and may include, settings, such as, settings for left handed users, when operating a robotic arm.

The user can set the distance that the portable computer detects external devices. Limiting the distance, may limit the distance that the user needs to travel to a device. Limiting the number of devices detected, might be used to filter out too many available choices. The devices connection range to the portable computer may be limited, by the radio range of the transmitter. The location of the device may limit the devices broadcast range, for example, when the mobile device is located on a train.

The mobile device computer can connect to more than one device at a time, and show the displayed devices, and operate the devices. The portable computer can connect and operate many devices, such as, a gas pump, a medical device, a store checkout station, a smart toilet, an elevator, a vending machine, a ATM, a flammable environment device, a door lock, a car lock, a car ignition, a room temperature thermostat, apartment lights, and a microwave oven.

The portable computer can operate more than one device at a time. Two device operating menus can be shown on the display. The user can input into the operating menus simultaneously, such as, the user can operate a vending machine, while operating the room lights.

The portable computer can operate devices made from differing companies, and differing styles of devices. The portable can operate elevators made from differing companies, differing styles of elevator, all that's needed is the ability of the elevator to communicate with the mobile device's computer, for the elevator to download the elevator operating menu to the mobile device's computer and have the portable computer be able to operate the elevator, using the user's input of the elevator operating menu, on mobile device's display.

Along with the user's devices, the user may receive and show devices from other users, these could be deleted so that they don't appear on the user's display. The user's devices can be password protected, to enable only the user's portable computer to operate their devices. Unwanted devices shown on the display can be removed. With many devices displayed, the user may scroll or page thru the device's. A smart watch can connect to the portable computer, and be used as a more convenient display to operate the external devices.

In an apartment, office building or house the available controllable devices would be displayed on the portable computer, such as lights, TV, radio, smart toilet, dishwasher, stove, microwave oven. The apartment devices can be operated using the portable computer. The portable computer, can find a car in a parking lot, and can unlock the doors, and start or stop the car's engine.

The portable computer can operate multi user devices such as, house lights, house door bell, office door locks, house door locks, car door locks. The devices can be programmed to allow only certain user's to operate the device, such as, only employees in an office would be allowed to operate an office room's lights. For example, only certain users would be able to operate a hospital x-ray machine. The portable computer controls lights in other differing apartments, other differing building office room, differing interior and differing exterior lights.

The mobile device's computer processors, may be a processor. The portable computer, and external device's computer can be programmed with operating system software. The processor is connected to a memory device. The memory is used for storing retrievable data.

The portable computer connects to the internet using a WIFI connection, and by activating the internet icon button. The WIFI receiver is incorporated within the computer. An alternating current supplies power to the external device, by a wired connection, to the display by a wire connection, and to the computer by a wire connection.

The object detection and selection mechanism is described below with reference to flowchart illustrations and or block diagrams of methods, apparatus (systems) and computer program products according to implementations thereof. It will be understood that each block of the flowchart illustrations, FIGS. 7 and 8, and or block diagrams, and combinations of blocks in the flowchart illustrations and/or block diagrams, can be implemented or supported by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions, acts specified in the flowchart and or block diagram block or blocks.

Figure 8:
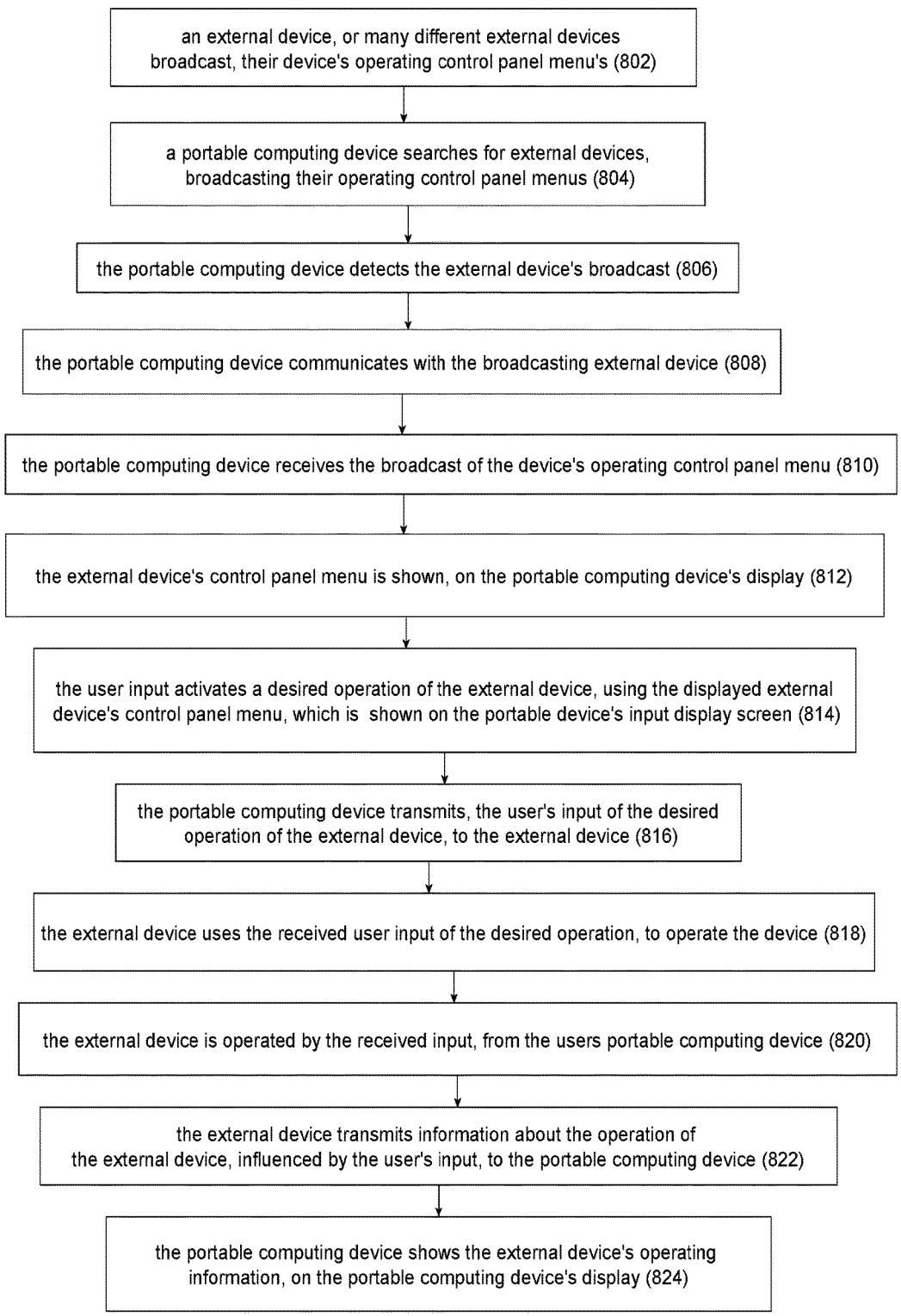
FIG. 8 depicts a flowchart of a mobile computing device's, operation of external devices.

Software steps of the portable computer and external device's operation, may include some of the following steps. In the device software and operation flowchart the following steps illustrate the portable computer and external device's operation, as shown in FIG. 8. An external device, or many different external devices broadcast, their device's operating control panel menu's (802), a portable computing device searches for external devices, broadcasting their operating control panel menus (804), the portable computing device detects the external device's broadcast (806), the portable computing device communicates with the broadcasting external device (808), the portable computing device receives the broadcast of the device's operating control panel menu (810), the external device's control panel menu is shown, on the portable computing device's display (812), the user input activates a desired operation of the external device, using the displayed external device's control panel menu, which is shown on the portable device's input display screen (814), the portable computing device transmits, the user's input of the desired operation of the external device, to the external device (816), the external device uses the received user input of the desired operation, to operate the device (818), the external device is operated by the received input, from the users portable computing device (820), the external device transmits information about the operation of the external device, influenced by the user's input, to the portable computing device (822), and the portable computing device shows the external device's operating information, on the portable computing device's display (824).

A device broadcasts, operating control panel menu (802), a phone searches for a device broadcasting, an operating control panel menu (804), the phone detects device broadcast (806), the phone communicates with broadcasting device (808), the phone receives broadcast device operating control panel menu (810) the control panel menu shown on phone display (812), a user touch inputs desired device function, on shown menu (814), the phone transmits user input of menu to device (816), the device uses received user input, to operate the device (818), the device transmits information about the operation of the device, to the phone (820), and the phone shows the device's operation information, on the phone's display (822).

These computer program instructions may also be stored in a computer-readable medium that can direct a computer or other programmable data processing apparatus to function in a particular manner, such that the instructions stored in the computer-readable medium produce an article of manufacture including instruction means which implement the function act specified in the flowchart and or block diagram block or blocks.

The computer program instructions may also be loaded onto a computer or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram block or blocks.

Figure 7:
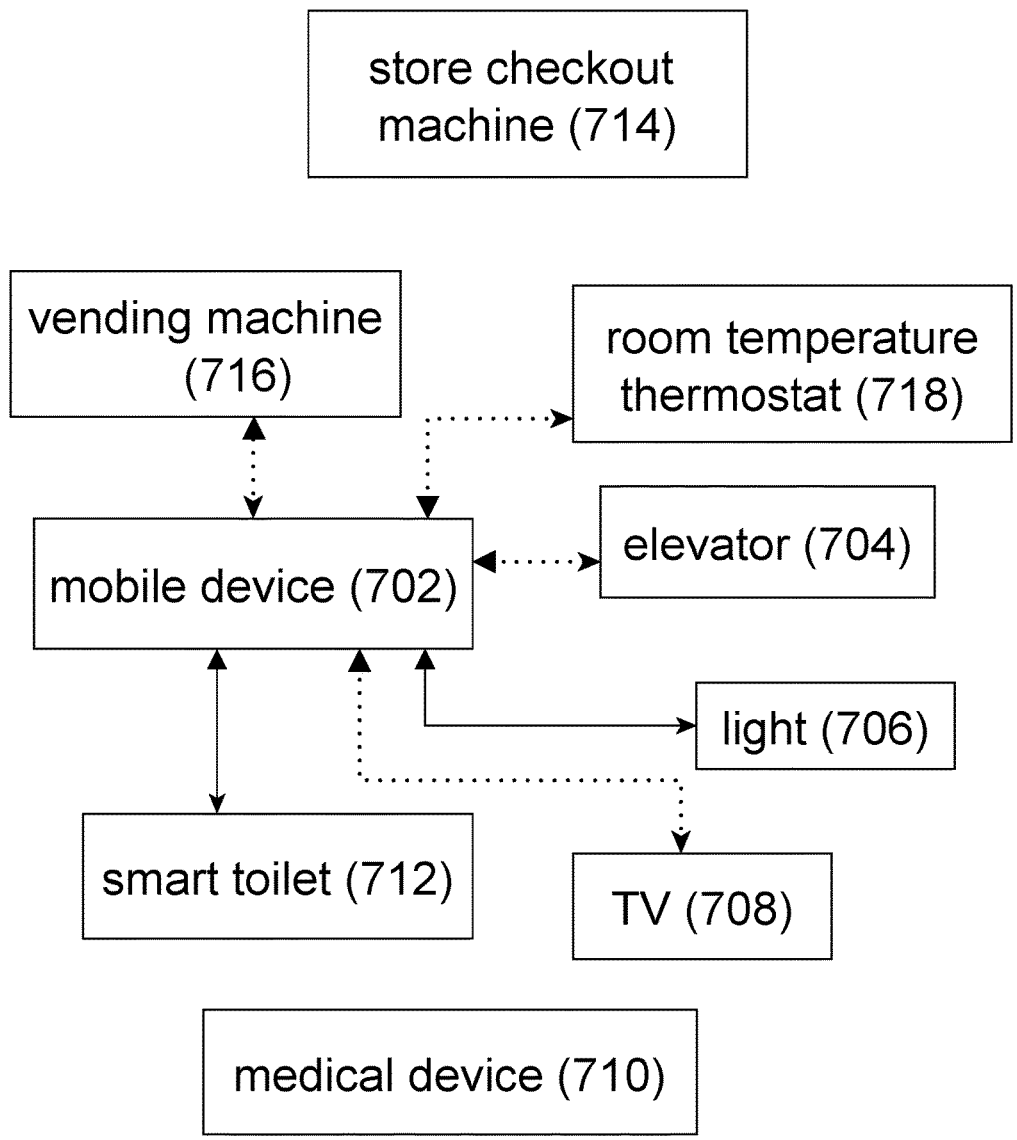
FIG. 7 illustrates a block diagram of hardware confections between a smart phone and external devices.

A block diagram show the portable computer and external device's possible radio wave connections. Solid lines show the portable computer and external devices are connected. Dotted line's show the portable computer and external devices are able to connect. The absence of connection line's show the portable computer and external devices are out of the connect area. The component connections are shown in FIG. 7, store checkout machine (714), vending machine (716), room temperature thermostat (718), mobile device (702), elevator (704), smart toilet (712), and medical device (710).

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

The device may further include on-board data storage, such as memory coupled to the processor. The memory may store software that can be accessed and executed by the processor, for example. The host may be any type of computing device or transmitter including a laptop computer, a mobile telephone, that is configured to transmit data to the device. The host and the device may contain hardware to enable the communication link, such as processors, transmitters, receivers, antennas.

The communication link may be a wired link via a serial bus such as USB, or a parallel bus. A wired connection may be a proprietary connection as well. The communication link may also be a wireless connection, such as Bluetooth, IEEE 802.11 (IEEE 802.11 may refer to IEEE 802.11-2007, IEEE 802.11n-2009, or any other IEEE 802.11 revision), or other wireless based communication links. In another example, the system includes an access point through which the device may communicate with the internet. In this example, the device may not require connectivity to the host. The access point may take various forms. For example, if the device connects using 802.11 or via an Ethernet connection, the access point may take the form of a wireless access point (WAP) or wireless router. As another example, if the device connects using a cellular air-interface protocol, such as a CDMA or GSM protocol, the access point may be a base station in a cellular network that provides Internet connectivity via the cellular network.

As such, the device may include a wired or wireless network interface through which the device can connect to the access point. As an example, the device may be configured to connect to access point using one or more protocols such as 802.11, 802.16 (WiMAX), LTE, GSM, CPRS, CDMA, EV-DO, and/or HSPDA, among others. Furthermore, the device may be configured to connect to access point using multiple wired and/or wireless protocols, such as "3G" or "4G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, the device may access the internee through the host.

The device's computer is connected to a motor controller by wire. The computer is powered by a connection to alternating electrical current and the motor controller is powered by a connection to an alternating current.

The computer operates the devices, such as, the space station toilet, by instructing the motor controller, to supply a power to a function of the device that the computer wants to operate. For example, the space station toilet's computer, directs the toilet's motor controller, to supply power to the toilets bidets water heater to supply water with a medium temperature. The motor controller supply's power to the toilets' water heater, which creates a medium water temperature, in the water streamed from the toilet's bidet.

Various programming languages can used to program the computer 106 such as C++, C#, C++/CLI.

Computer program code for carrying out operations of the object detection and selection mechanism may be written in any combination of one or more programming languages, including an object oriented programming language such as Java, Smalltalk, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

The portable computer could also be a laptop computer, a smart phone, a portable computer, and a tablet computer, and a computer processor connected to other computer components.

It will be readily understood that the aspects of the present disclosure, as generally described herein, and illustrated in the figures, can be arranged, substituted, combined, separated, and designed in a wide variety of different configurations, all of which are explicitly contemplated herein.

The means for the computer to have a connection to one or a plurality of differing external devices, when the portable computer is in the vicinity of one or more of the device, is the connecting of the portable computer to the differing external devices, using radio waves. The means for the portable computer to communicate with one of the plurality of external devices and or the plurality of external devices, is a compatible standardised software computer language used between the portable computer and devices. The means for the portable computer to have the connected device's control panel communicated to the phone, is the ability of the device to broadcast the device's control panel to the portable computer, and the ability of the portable computer to download the control panel from the device. The means for the communicated device control panel to be shown on the display, is the portable computer connected to the display.

The means for a user to operate the control panel shown on the portable computer's display, is a software programmed into the portable computer, allowing for the user to touch input the shown menu on the display. The means for operation of the control panel on the portable computer display to operate the device, is the ability of the portable computer to send to the external device, the user's touch input of the device operation menu, which activates various functions of the external device.

Alternate Embodiments

Different Devices can be Operated by a Phone Description and Operation

Different devices can be operated by a smart phone, or other mobile computing device. If the device has the software language to communicate with the phone, an ability to connect with the phone, and the operation of the phone can be implemented by the device. For example, the phone can operate elevators made by different companies, different makes, style configurations of elevator, if the elevator has hardware and software connected to the elevator, which allow the elevator to be operated by the phone.

The phone and the device communicate using radio waves. Other ways to connect, such as, infrared light communication, can be used.

The phone and device use a compatible software language, a standardized software language, a communicable software language to communicate with each other. The devices each have a computer, with a microprocessor connected to a storage. The computer in the phone is used for processing, the operation of the downloaded device control panel.

The computer in the external device is used for processing, and implementing the information received from the phone, concerning the user's operation and input of the device's operating menu on the phone. The received user input information, by the external device, is used in the operation of the external device. A unified remote control for many things.

Instead of having the devices control panel automatically downloaded to the user's phone, the display can be set to first show on the display, the devices that are available for download. The user can chose the devices control panel that they want to download.

The smart phone can download differing device's control panels, and use the control panel associated with the device to operate the device.

Figure 11:
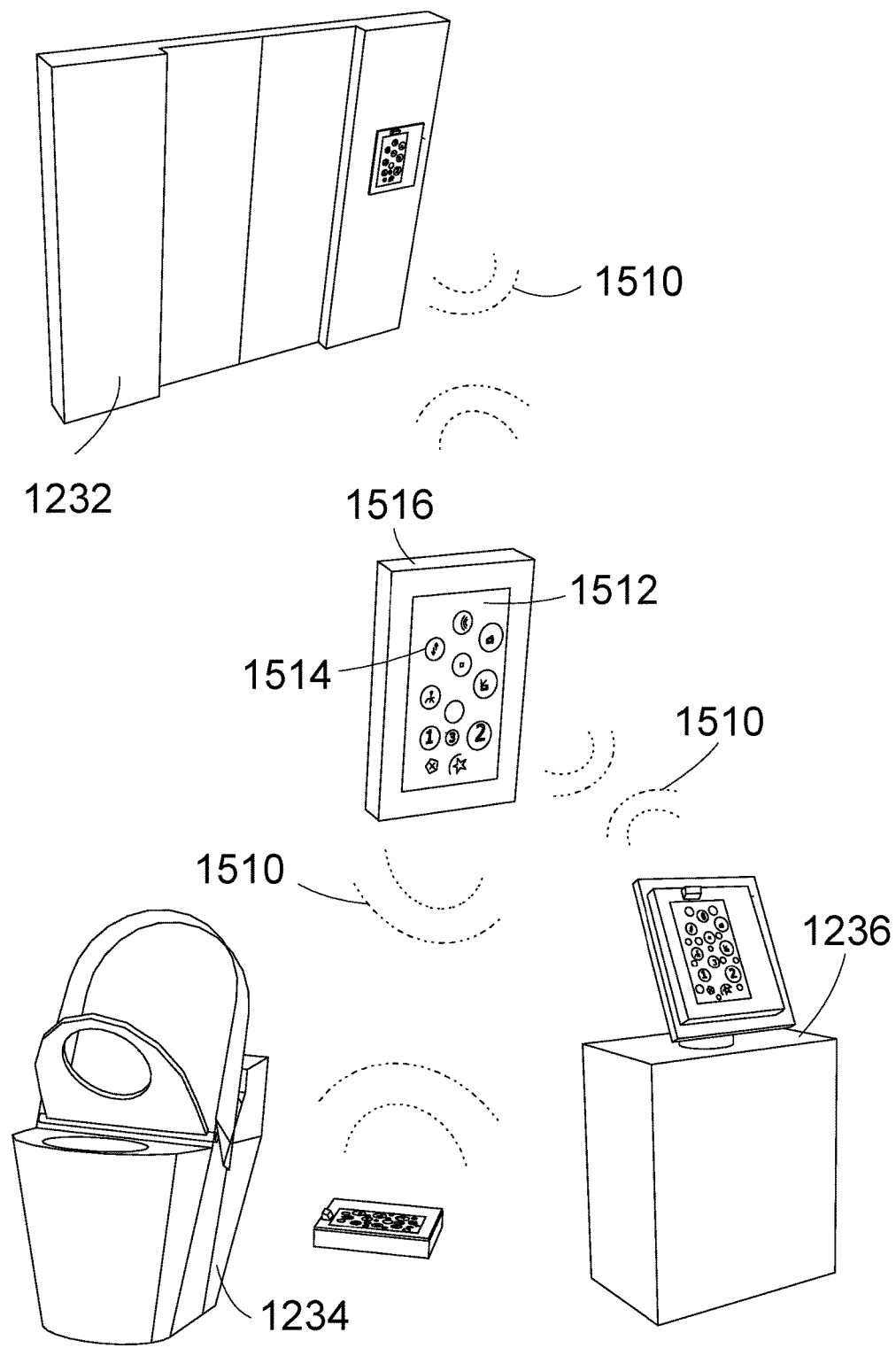
FIG. 11 shows a perspective view of a smart phone, a radio wave connection between the smart phone, and devices including, an elevator, a smart toilet, and a store checkout machine.

A Store Checkout Machine's Control Panel Downloaded to a Smart Phone Description and Operation When a user's smart phone 1516, or other mobile computing device is in the vicinity of a store checkout machine 1236, as shown in FIG. 11. The phone wirelessly detects the checkout machine and communicates with the machine. The machine's control display panel icon is downloaded to the phone's display.

The smart phone may connect to and communicate to differing external devices, using a radio wave connection between the phone and the differing store checkout machine's, and or an internet connection between the phone and the differing devices.

The user sees an icon with a description of the device associated with the icon, which is available for operation. The user touch activates the icon with their finger. A checkout machine display touch input panel appears. The panel shows a menu of the machines operations.

The user operates the checkout machine using touch input of differing icons associated with differing functions of the machine. The machine can be operated by touch activating icons of the menu. The phone's displayed interaction with the machine, is the same as it would be, if the user was using the checkout display. The checkout display also shows the operation of the checkout machine.

The user uses the panel on their phone to pay for items that have been checked out by a store employee. The user pays for products using financial payment instruments, such as, a smart phone payment system communicating with the store checkout machine 1236, a credit card, or debit card, as shown in FIG. 11.

The user may use the smart phone 802, to touch input their account number, and password. The user touches, the displayed numbers, on a displayed number keypad. The display 1512 may be also used for self-service checkout by the user, by using a self-serve store checkout machine, which reads the items bar codes.

The devices can connect to an internet router, the router connects to the internet, using a wired or radio wave connection.

Figure 1:
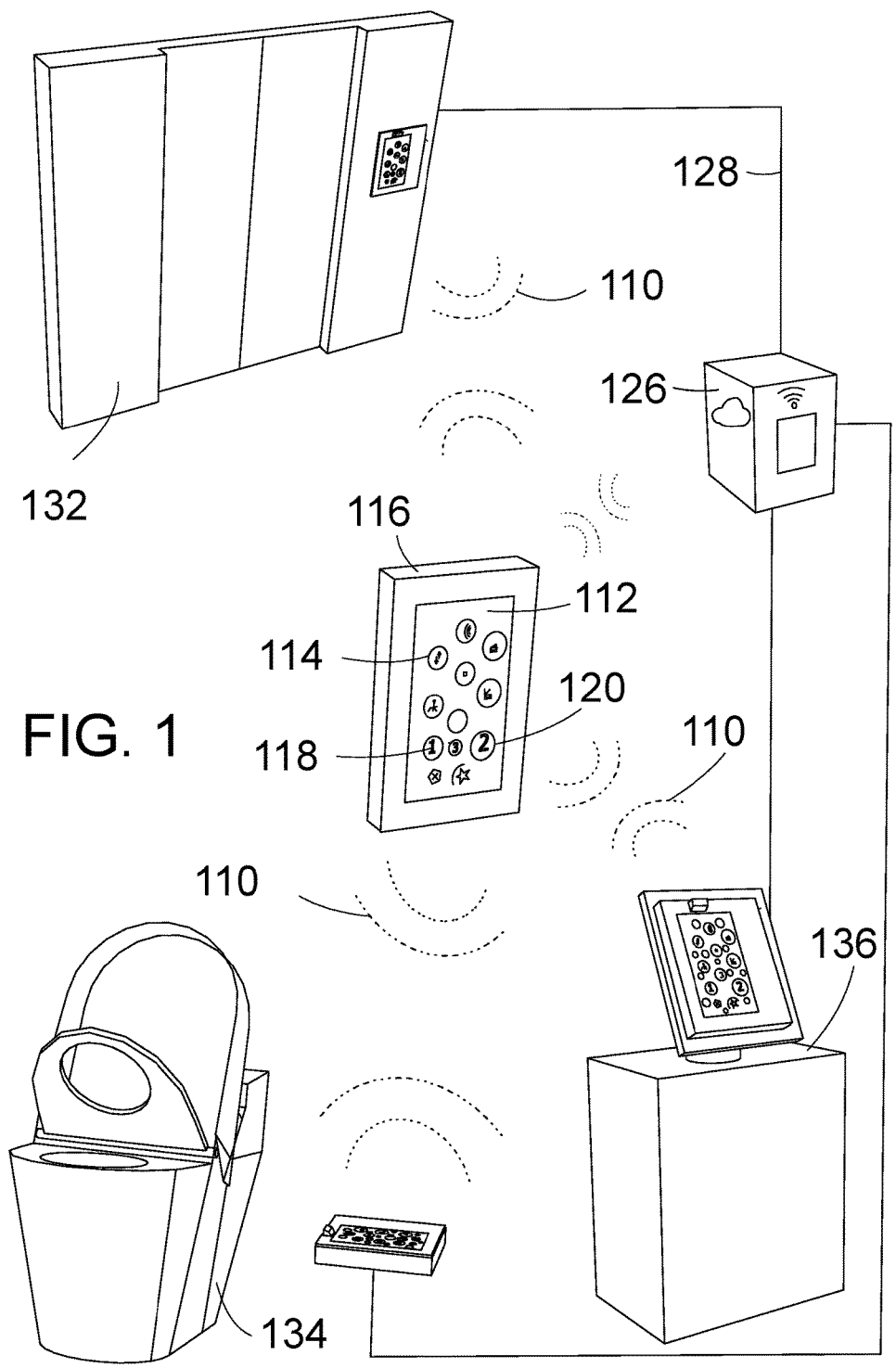
FIG. 1 shows a perspective view of a smart phone, or mobile computing device, a radio wave connection between the smart phone, and devices including, an elevator, a smart toilet, and a flammable environment device.

Pre-set settings, downloaded to the checkout machine from the phone, may include the credit card used to pay of the purchased items A Touch Free Flammable Vapor Environment Device Control Panel Downloaded to a Smart Phone Used to Avoid Static Electric Discharge Description and Operation When the users smart phone 116 is in the vicinity of a flammable environment device 136, as shown in FIG. 1. The phone wirelessly 110 detects the device and communicates with the device. The device's control display panel icon is downloaded to the phone's display 112. The downloading of the icon 118 indicates that the device is available for operation.

The smart phone may connect to and communicate to different external devices, using a radio wave connection between the phone and the differing devices, and or an internet connection between the phone and the differing devices.

The user sees a flammable environment device icon 118 with a description, of the device associated with the icon. The user touch activates the icon with their finger. The activated icon displays a touch control panel menu. The menu includes icons showing differing functions, associated with operations of the device. The device can be operated by touch activating icons, of the menu. The user operates the device using touch input to activate differing icons, associated with differing functions of the device.

The smart phone display control panel 112, can reduce the problem of static electricity, in a flammable vapor environment. The user my create a static electric discharge, between the user's finger and an external device's display panel, as shown in FIG. 1. The electric discharge, may ignite air borne flammable vapor or material.

Using the phone 116 to operate the device, reduces the need to touch the external device's display, to operate the device. The chance of static electrical discharge is reduced, since the phone is part of the person's electrical field, when touch inputting, into the phones display.

Using the phone in flammable environments, may be aid in reducing the chance of ignition of air borne flammable vapors or particles. Airborne flammable vapor or particles may be present in the air, in locations, such as, silos with grain dust, petroleum refineries, and paint plants. The flammable environment device could be a, gas compressor.

An Elevator Control Panel Downloaded to a Smart Phone Description and Operation

When the user's smart phone 116, or other portable computer is in the vicinity of an elevator 132, shown in FIG. 1. The phone detects being near the elevator, by using their locations plotted on an internet map. The phone communicates with the elevator. The elevator control panel icon, is downloaded to the phone's display. The user can touch activate the icon 120. When the icon is activated, an elevator display input panel appears. The panel shows a touch input menu of the elevator operations.

The smart phone may connect to and communicate to differing external devices, using a radio wave connection between the phone and the differing devices, and or an internet connection between the phone and the differing devices A Gas Pump Control Panel Downloaded to a Smart Phone Description and Operation When the user's smart phone is in the vicinity of a gas pump 228, or other mobile computing device. The phone 216 wirelessly detects the pump, and communicates with the pump. The pump control panel icon, is downloaded to the phone's display 212. The user can touch activate the icon 214. When the icon is activated, a pump display input panel appears. The panel shows a touch input menu of the pumps operations.

The user touches the panel face, surface, too activate an icon. The user uses the interactive input display, to operate the gas pump, as shown in FIG. 2. The user 242 can activate the icons, by touching their finger, on the displayed icon.

The user touches icons, to choose the octane of gas, and to pay for the gas. The activated shown icon, is associated with the operation of the pump, and activates gas pump functions, for example, a delivery of gas, and paying for the gas.

The phone receives feedback information, while the device is operating, such as, how much gas is being pumped. The phone display's interaction with the gas pump is the same as it would be, if the user was using the pump's input display 226. The pump's display, also shows the operation of the pump 228.

With more than one pump, the pumps would display numbers, with corresponding pump numbers on the display. The user chooses the pump number that they want to operate.

The smart phone may connect to and communicate to differing external devices and differing gas pumps, using a radio wave connection between the phone and the differing devices, and or an internet connection between the phone and the differing devices.

Pre-set settings, downloaded to the radio from the phone, may include gasoline octane to be pumped.

An Automated Teller Machine Control Panel Downloaded to a Smart Phone Description and Operation When the user's smart phone, or other mobile computing device is in the vicinity of an automated teller machine ATM 230, as illustrated in FIG. 2. The phone 216 wirelessly detects the automated teller machine, and communicates with the ATM. The ATM machine control panel icon, is downloaded to the phone's display.

The user touches the displays panel face, surface, too activate the icon. The user, touch activates, the icon. An ATM display input panel appears. The panel shows a menu, of the ATM's operations.

The phone 216 receives feedback information while the device is operating, about the ATM, such as, the amount of funds deposited, and account balances. The phone display's the interaction with the user, the same as would be if the user, was using the ATM's input display 224.

With more than one ATM, the ATM s show numbers, that correspond ATM numbers on the phone display. The user chooses the ATM number that they want to operate. The user touches the phone icon that they want to activate, the icon activates. The activated icon input, operates a function of the ATM. The ATM uses the phone display, to accept user cash deposits, cash withdraws, and other banking transactions. The ATM's display also shows the operation of the ATM.

The smart phone may connect to and communicate to differing external devices and differing automated teller machines, using a radio wave connection between the phone and the differing devices, and or an internet connection between the phone and the differing devices.

Pre-set settings, downloaded to the ATM from the phone, may include which of the user's accounts to use and display first.

A Vending Machine Control Panel Downloaded to a Smart Phone Description and Operation In FIG. 2, when the user's phone, or other mobile computing device is in the vicinity, of the vending machine 208. The phone wirelessly 210 detects the vending machine, and communicates with the machine. The machine's control panel icon, is shown on the phone's display, indicating the control panel is available for download, to the phone. The user touch activates, the icon. The vending machine control display panel icon, is downloaded to the phone's display. A machine display input panel appears. The panel shows a menu of the machine's operations.

The user touch activates the icon, with their finger. The activated icon, displays a touch control panel menu. The device that can be operated, by touch activating icons of the menu. The user operates the device, using touch input of differing icons associated, with differing functions of the vending machine.

The user touches the icon that they want to activate on the machine display, as illustrated in FIG. 2. The display allows the user to select products, from the machine. By inputting their product selection. The user touch inputs, displayed icons, and or a displayed number keypad, to operate the machine.

The user can pay for the products, using the display. The user may use a credit card, a debit card, or bank checking account funds information stored on the phone, to pay for the product.

The phone display's interaction with the user, is the same as would be if the user, was using the vending machine's display 202, with the same or similar icons 206 on the machine's display, as on the phone's display.

With more than one machine, the machines show numbers corresponding to, numbers on the phone display. The user chooses the machine number that they want to operate. Names of products could also be used to associate the displayed icons, to the machine such as, drink, chip, and food machine.

The smart phone may connect to and communicate to differing external devices and differing vending machines, using a radio wave connection between the phone and the differing devices, and or an internet connection between the phone and the differing devices.

Pre-set setting downloaded to the vending machine from the phone, may be stored on the user's phone or accessed on the internet cloud and may include, a favorite candy item, or drink item.

A Smart Toilet Control Panel Downloaded to a Smart Phone to Operate a Toilet Hygienically, Description and Operation When the user's phone 116, or other mobile computing device is in the vicinity of the smart toilet 134, the phone connects to the toilet, shown if FIG. 1. The phone 110 detects the toilet and phone's vicinity to each other, over the internet and communicates with the toilet.

A toilet display panel icon 114 is downloaded to the phone's display 112. The control panel is shown, on the phone's display, for available download to the phone's display. The user sees an icon, with a description of the device associated with the icon, which is available for operation.

The user touch activates the icon. A toilet display input panel appears. The panel shows a menu, of the toilet operations. The menu of icons shows functions which are associated with operations of the toilet.

The user touches the toilet device icon 114 that they want to activate. The icon activates, on the phone's display 116, as illustrated in FIG. 1. The activated icon input, operates the associated toilet device. The activated icon, which is associated with the operation of the device, activates the devices functions.

The phone operates toilet devices, such as, a bidet front or back cleaning position, a bidet water temperature, and a water pressure. The toilet's display 134, also shows the operation of the toilet.

The smart phone may connect to and communicate to differing external devices and differing smart toilets, using a radio wave connection between the phone and the differing devices, and or an internet connection between the phone and the differing devices.

Pre-set settings, downloaded to the toilet from the phone, for the toilet, are stored on the user's phone 116 or accessed on the internet cloud, may include, a bottom air dyer air speed, the bidet water temperature, and the bidet water pressure.

Figure 3:
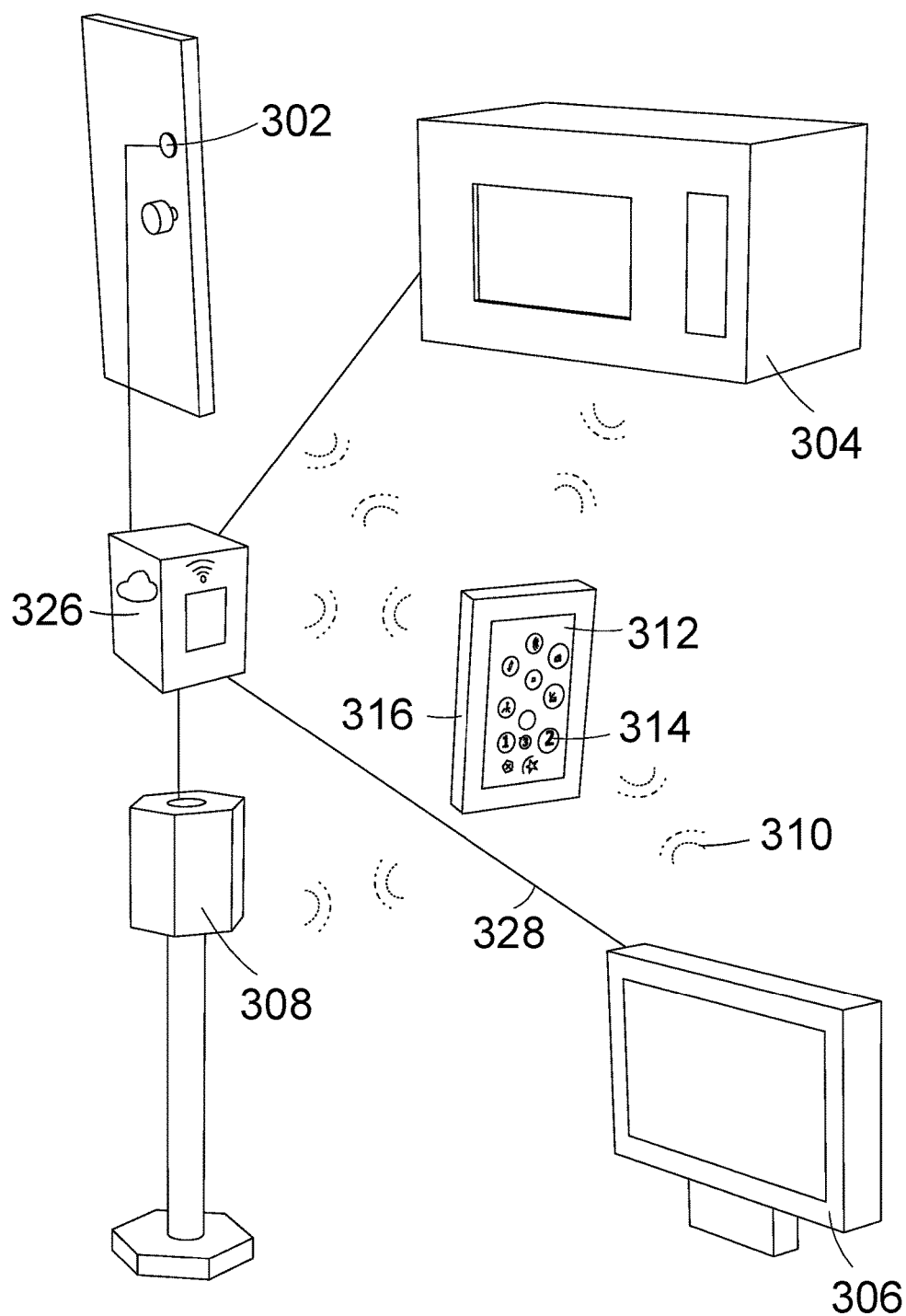
FIG. 3 shows a perspective view of a smart phone, a radio wave connection between the smart phone, and devices including, a door lock, a microwave oven, a lighting device, and a television.

The phone 316, or other mobile computing device can operate a lock door 302, in FIG. 3. The phone screen 312 can show door unlock, yes 314, or no. Touch activating yes would wirelessly 310 signal, the door to unlock. The lock could also use a pin number to unlock the lock. Entering the pin number, would unlock the door. With the door unlocked, the user has the option of locking the door, using a shown lock door on the display.

Room lights 308 can be controlled by the phone 316, or other mobile computing device. The phone display can show a lights off or lights on icons, or a light dimming option in FIG. 3. The user operates the lights by touch activating the desired light operation. Pre-set settings, downloaded to the lights from the phone, may include a preferred room lighting.

The phone 316 can operate a Television TV by using the phone. The TV's operating menu can be downloaded to the phone. The phone operates the TV using the downloaded TV operating menu, illustrated in FIG. 3. Pre-set settings, downloaded to the TV from the phone, may include a preferred TV station.

The phone 316 can operate a microwave oven 304 using the phone. The microwave oven's operating menu can be downloaded to the phone. The phone operates the Microwave oven using the downloaded Microwave oven operating menu, illustrated in FIG. 3. Pre-set settings, downloaded to the microwave oven, from the phone may include a preferred cooking time.

The devices can connect to an internet router 326, the router connects to the internet, using a wired 328 and or radio wave 310 connection.

Figure 4:
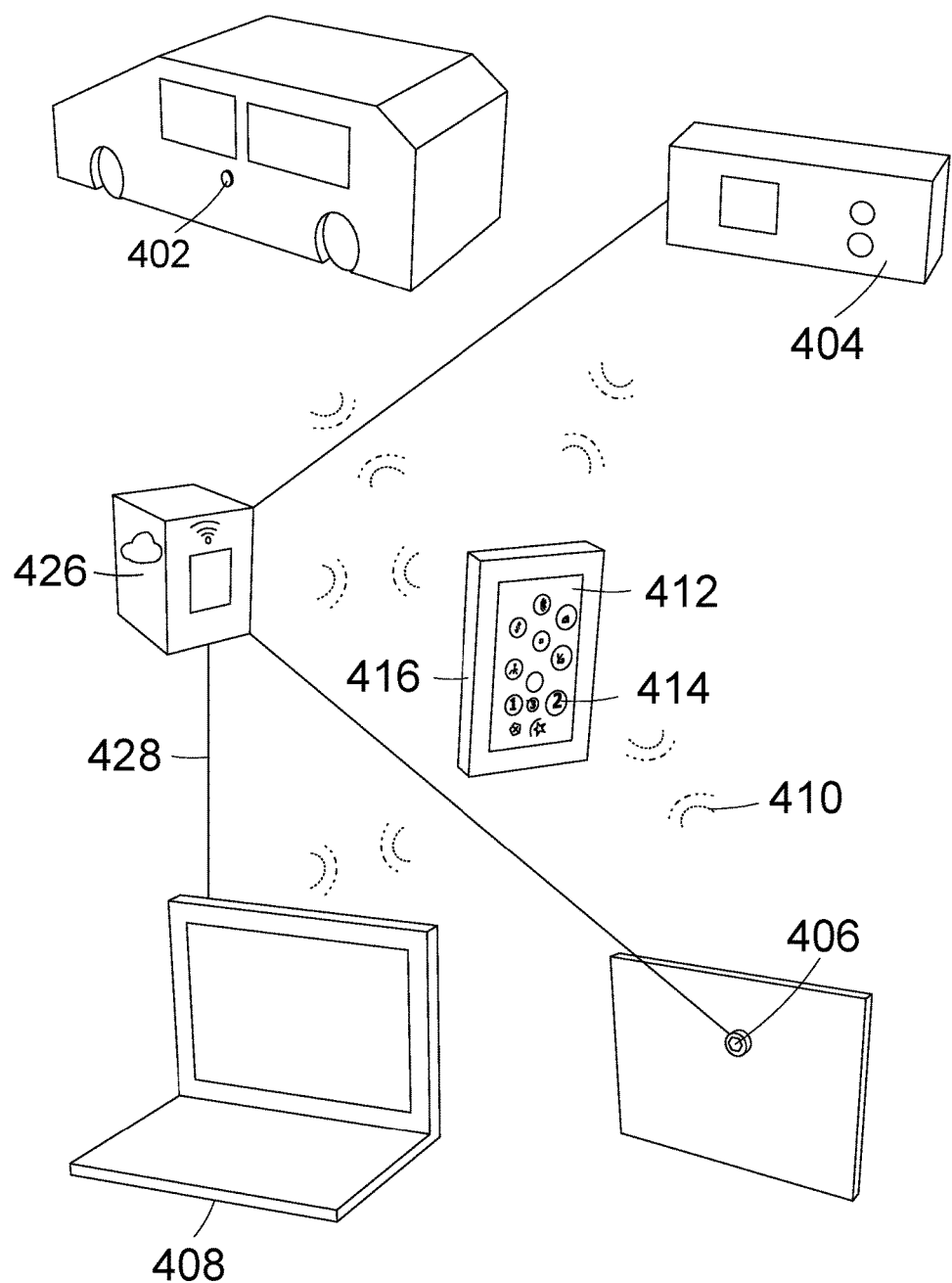
FIG. 4 shows a perspective view of a smart phone, or mobile computing device, a radio wave connection between the smart phone, and devices including, a car door lock, a radio, a laptop computer, and a room thermostat.

The phone 416, or other mobile computing device can operate an electric car lock door 402, in FIG. 4. The phone screen 412 can show door unlock, yes 414, or no. Touch activating yes would wirelessly 410 signal, the door to unlock. The lock could also use a pin number to unlock the lock. Entering the pin number would unlock the door. With the door unlocked the user has the option of locking the door using a shown, lock door on the display. The phone can also start and stop the car. The devices can connect to an internet router 426, the router connects to the internet, using a wired 428 and or radio wave 410 connection. Pre-set settings, downloaded to the lock from the phone, may include a preferred car seat temperature.

Room temperature can be controlled by the phone 416, or other mobile computing device. The phone display can show a thermostat 406, whose temperature can be raised or lowered, in FIG. 4. The user operates the room thermostat by touch activating the desired thermostat's temperature shown on the phone. Pre-set setting downloaded to the thermostat from the phone, may include a preferred room temperature.

The phone 416, or other mobile computing device can operate a laptop computer 408 using the phone. The laptop's operating menu can be downloaded to the phone. The phone operates the laptop using the downloaded laptop operating menu, illustrated in FIG. 4.

The phone 416 can operate a touch screen laptop computer 408, illustrated in FIG. 4. The laptops input display is shown on the phone's display 412. The laptop display shown on phone can operate the computer in a similar fashion as the display on the computer would operate the computer. The user touches the computer display icons on the phone 414, which operates and inputs data to the computer. The phone is connected to the touch screen computer using and internet connection, the user can surf the internet, and operate other computer applications. The touch screen computer is connected to the internet.

Pre-set setting, downloaded to the laptop from the phone may for the laptop may include a preferred web page, or web site.

The phone 416 can operate a radio 408 using the phone. The radio's operating menu can be downloaded to the phone. The phone operates the radio using the downloaded radio operating menu, illustrated in FIG. 4. Pre-set settings, downloaded to the radio from the phone, may include a preferred radio station.

Figure 6:
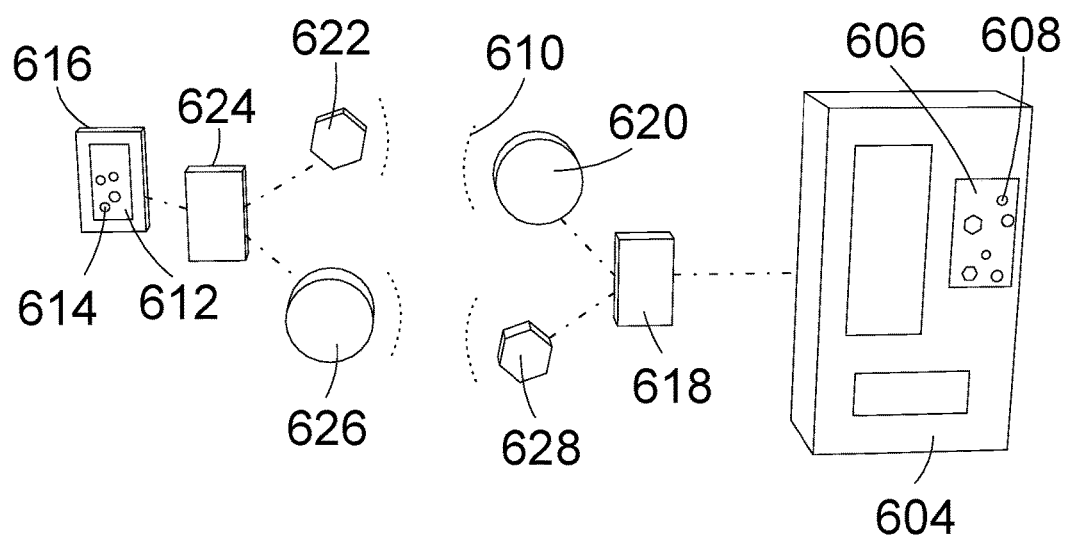
FIG. 6 shows a perspective view of a smart phone, a radio wave connection between the smart phone and a vending machine.

Radio Waves Use in the Communication of a Phone with a Vending Machine Description and Operation FIG. 6 shows the communication connection between a phone and a vending machine, by using radio waves. The vending machine 604 is connected to a computer 618. The computer 618 is connected to a radio wave transmitter 620, and radio wave receiver. The machine's transmitter 620 broadcasts a continuous signal 610, that the vending machine 604 is available for operation. The machine broadcasts an automatic download, communication of the vending machines control panel 608, to available phones in the machine's vicinity.

The phone is connected to a computer 624. The computer is connected to a receiver 622, and transmitter 626. The phones receiver searches the area, to find machines broadcasting their availability for operation. The phone's receiver 622, searches the area to find machines broadcasting, their automatic download, communication of their control panel display to the phone. The phone's receiver automatically downloads the machines control panel 608, broadcast by the machines transmitter 620.

The user operates the shown control panel 614 on the display 612, by touch inputting machine operating icons 614, shown on the display. The phone's icons are similar in their operation o of the machine, as the control panel icons 608 on the machines display 606.

The phone's computer 624 sends the user's machine operation information to the phones transmitter 626, which broadcasts the user's operation information to the vending machine receiver 628. The vending machine receives the user information, broadcast by the phone's transmitter. The machine's transmitter sends the received user information, to the machines computer. The machines computer uses the user information, in the operation of the machine. The machine sends the phone information, concerning the user's information used in the operation of the machine.

Transmitters and receivers are connected to their own computer. The computer can be connected to any device. The transmitters and receivers are connected to a computer which are connected to the device to allow the operation of the device by a phone. The device's transmitter and receiver communicate with the phones transmitter and receiver using radio waves. The phone communicates with the device, using radio waves which are created by the phones transmitter. The phone receives radio waves, with the phones receiver. The phone's transmitter and receiver are connected to the phones computer.

Transmitters and receivers connected to a computer may be added to a device to enable it's operation by the phone. Devices which already have communication devices, such as radio waves transmitters and radio wave receivers, such as smart toilets, may only need software that enables the phone to connect and communicate with the device, using radio waves.

Figure 15:
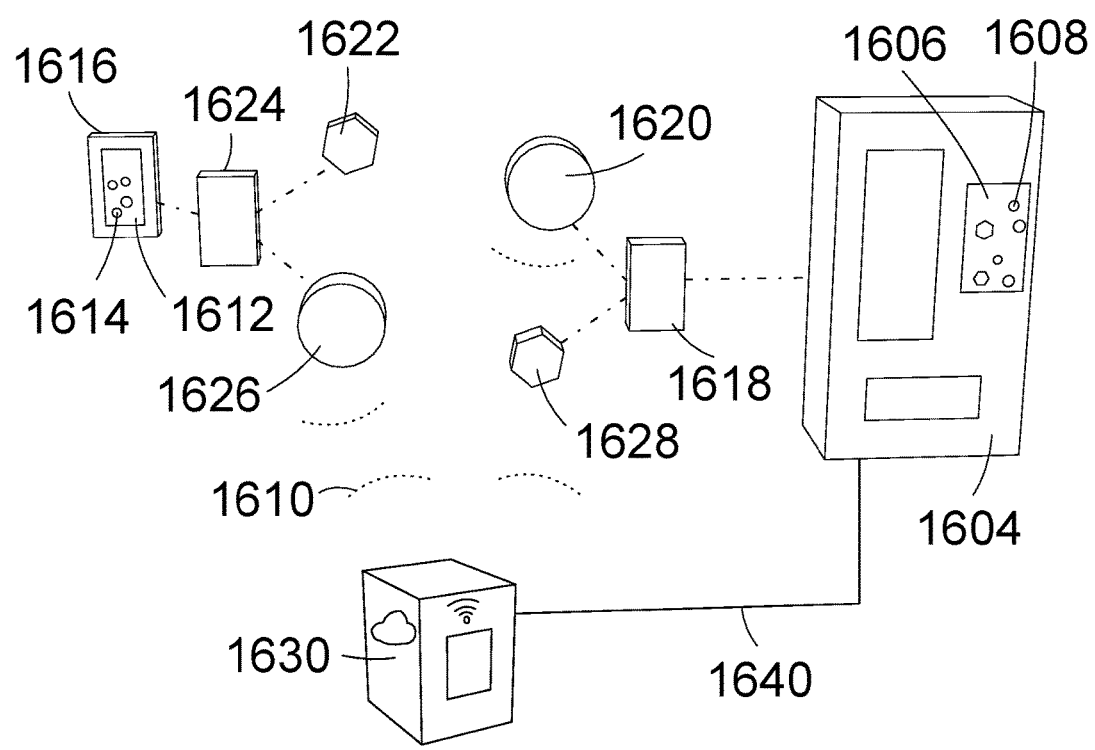
FIG. 15 shows a perspective view of a smart phone connected to a vending machine, using a radio wave connection and or internet connection between the smart phone and the vending machine.
Figure 21:
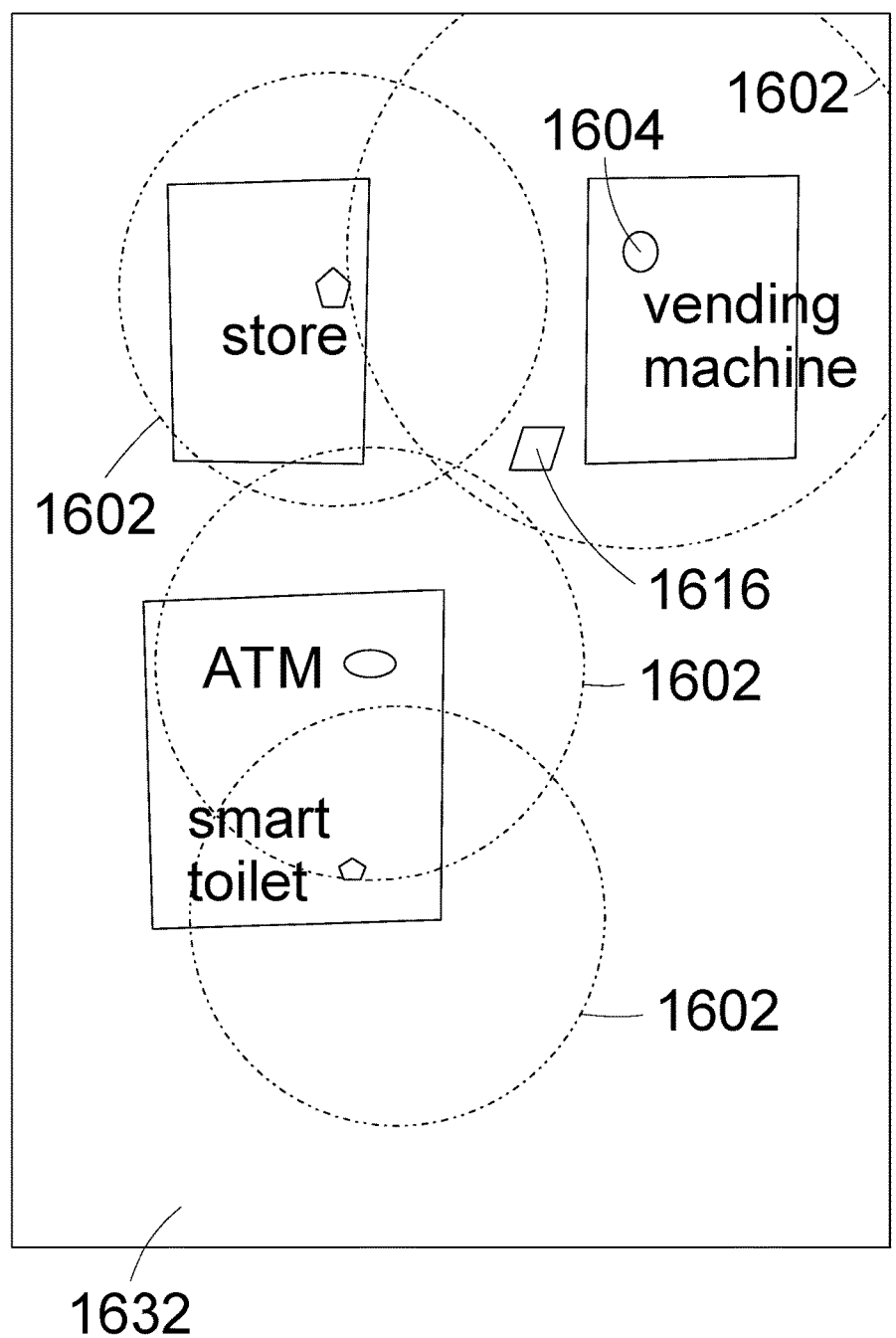
FIG. 21 show a view of a map depicting distances, from which devices operating menus are sent to a phone.

An Internet Connection's Use in Communication of a Phone with a Vending Machine and Other Differing Devices Description and Operation A phone, or portable computer 1616, can connect to external devices using the internet, shown in FIGS. 15 and 21. The portable computer's location can be found using the portable computer global positioning system GPS, or cell phone location. The portable computer can be located on an internet map 1632. The map includes the external devices locations on the map. The devices, such as, a vending machine 1604 can communicate with the portable computer, connecting with the portable computer using an internet connection, using internet communication, and communicating over the internet.

The phone is located on the map, show in FIG. 21. The map shows the plotted location of different external device's locations. The phone and devices each has a software that allows them to know each other's location on the internet map. The portable computer and external devices location can be tracked and plotted, on the internet map such as, Google Maps made by the Google Company, or Microsoft Maps made by the Microsoft Company, to determine when the user is in the vicinity 1602 of the devices.

The devices can communicate their availability to be operated by the portable computer, when the portable computer is in the vicinity 1602 of the devices. The portable computer downloads, over the internet, differing device's control panels, and uses a control panel display associated with one of the device's to operate the device, over the internet.

The user input operates the device menu, shown on the display. The portable computer inputs data, from the user's input of data, over the internet, into differing devices. The data sent over the internet by the portable computer, operate the device, and or inputs data into the device.

The devices can have a wired or wireless connection to the internet. The portable computer has a wireless connection to the internet.

A internet of things has been focused on the connection of devices to the internet. The connected devices can be monitored by other devices connected to the internet. Differing devices can be operated by the portable computer using the internet, when the user is in the vicinity of the device.

FIG. 15 shows the communication connection between the phone and a vending machine, by using an internet connection. The vending machine 1604 is connected to a computer 1618. The machine's computer 1618 is connected to a radio wave transmitter 1620, and radio wave receiver. The machine connects to a internet router using radio WIFI waves or a wired connection. The machine can also connect to the router by wire 1640. The router is connected to the internet by wire.

The machine's transmitter 1620 broadcasts a continuous signal to the internet router 1610, that the vending machine 1604 is available for operation. The devices can also connect to the internet, using a cellphone microwave connection. The devices can connect to a device internet router 1630, the device router connects to the internet, using a wired 1640 and or radio wave 1610 connection.

The machine broadcasts over the internet an automatic download, communication of the vending machines control panel display 1508, to available phones in the machine's vicinity.

The phone is connected to a computer 1624. The computer is connected to a receiver 1622, and transmitter 1626. The phone connects to the internet wirelessly, using radio WIFI waves, or cell phone microwave. The phone communicates with devices, using the internet by downloading and uploading internet data.

The phone searches the area using the internet, to find machines broadcasting their availability for operation. The phone 1622, finds machines broadcasting, their automatic download, of their control panel to the phone. The phone's receiver automatically downloads the machine's control panel 1608 over the internet, broadcast by the machine on the internet 1620.

The user operates the shown machine control panel 1614 on the display 1612, by touch inputting the control panel operating icons 1614, shown on the display. The phone's icons are similar in their operation of the machine, as the control panel icons 1608 on the machines display 1606.

The phone's computer 1624 sends the user's machine operation information to the phones transmitter 1626, which broadcasts the user's operation information to the internet, and to the vending machine connected to the internet 1628. The vending machine 1604 receives, and downloads the user's operating information, broadcast by the phone's transmitter.

The machine sends the received user input information, to the machines computer. The machines computer uses the user operating information, in the operation of the machine. The machine sends the phone, information concerning, the user's information, used in the operation of the machine.

Transmitters and receivers are connected to their own computer. The computer can be connected to any device. The transmitters and receivers are connected to a computer which are connected to the device to allow the operation of the device by a phone. The device's transmitter and receiver communicate over the internet, with the phone's transmitter and receiver using radio waves. The phone communicates with the device over the internet, using radio waves which are created by the phones transmitter. The phone receives radio waves, with the phone's receiver. The phone's transmitter and receiver are connected to the phone's computer.

Transmitters and receivers connected to a computer, may be added to a device, for a radio wave, or a wired connection to the internet. The internet connection enables the devices operation over the internet, by the phone. Devices which already have internet communication devices, such as radio waves transmitters and radio wave receivers connected to internet routers, such as smart toilets, may only need software, which enables the phone to connect and communicate over the internet with the device, using radio waves.

A Store Control Panel Downloaded to a Smart Phone Used Operate a Store Checkout Description and Operation A phone can be used to shop in a store. A user can self-serve checkout at a self-serve checkout station. A screen is the same on the phone as on the checkout station. The user could also checkout using a barcode scanner incorporated into the phone, by scanning the items' barcodes with the phone. Paying for the items on the display with a credit card that is stored on the phone. The items antitheft devices can turn off after payment.

The camera can view the items before payment, to make sure the user hasn't made a mistake with the number of items, and that all items have been charged. If a mistake is detected the phone audibly and visually alerts the user. The checkout process is monitored by store employees, who view the process on display screens, and view the same screen that the user views, and views the user. The user could also pick items, record their barcode on the phone and at checkout have the recorded items brought to then.

Pre-Set Device Settings for Use with Differing Devices Operation and Description A user's phone can connect to and send pre-set user settings for an external device's operation. Devices using pre-set settings may include, a gas pump, a medical device, a store checkout station 536, a smart toilet 534, an elevator 532, a ATM, a space station device, a flammable environment device, door locks, a car lock, a car starting device, a room temperature thermostat, apartment lights, and a microwave oven.

Phone Connection

The smart phone may connect to and communicate device settings, to differing external devices, using a radio wave connection between the phone and the differing devices, and or an internet connection between the phone and the differing devices.

Figure 5:
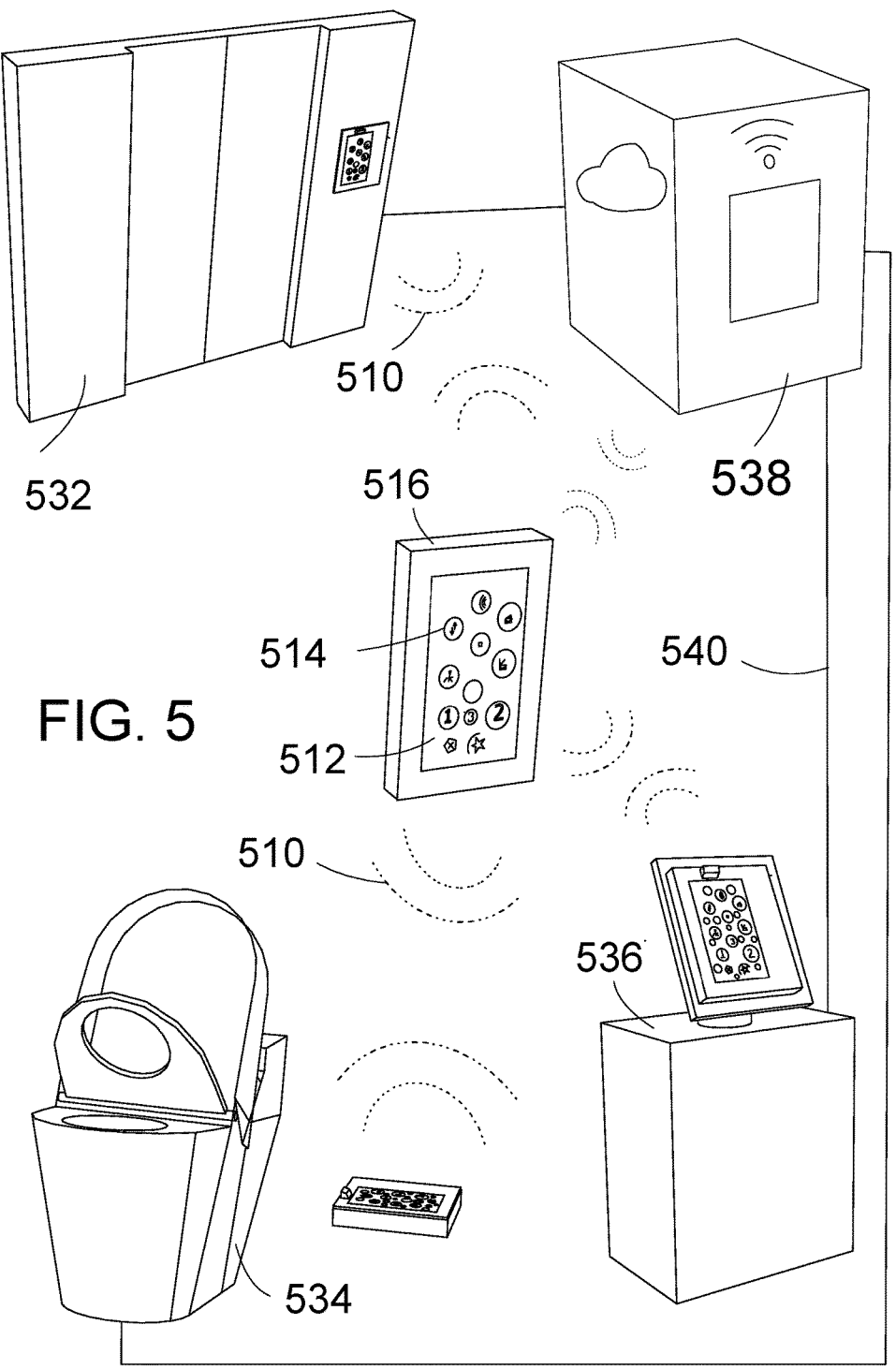
FIG. 5 shows a perspective view of a smart phone with stored device settings, a radio wave connection and or internet between the smart phone, and devices including, an elevator, a smart toilet, and a store checkout station, and a connection between the devices and a computer server with stored device setting.

The external devices 532, 534, 536 broadcast that a phone connection 510 is available to the devices, as illustrated in FIG. 5. A phone 516 searches for an external device broadcasting 510 the available connection. When the phone finds a broadcasting device, the phone 516 connects to the device 534. The phone and device communicate sharing information, and the phone identifying the device. The phone sends the device, user device settings, associated with the device. The device uses the received device settings in the operation of the device.

Stored Settings

The settings can be stored on the phone, in a profile of user settings, which are associated with the user. The devices can connect to an internet router 538, the router connects to the internet, using a wired 540 and or radio wave 510 connection.

The user can see an icon, with a description of the device associated with the icon which has had its settings sent to.

If the device doesn't receive device settings from the phone. The device would request the user's identification. The phone sends the user identity to the device. The device searches for stored settings, associated with the user identity on the device's computer. The device's computer finds a match with the user's identity and stored user identity.

The user's stored device settings associated with the user would be activated. The device uses the received device settings in the operation of the device. The settings can be stored in a profile of user settings, which are associated with the user. The user profile settings are stored on a computer, connected to the device.

Identifying the User

The device may try other ways to identify the user, such as, facial recognition. If facial recognition is successful, in identifying the user, the devices stored setting associated with the user, would be activated. The setting are stored on a computer, connected to the device.

Pre-set setting can be stored on the user's phone 516, or stored on the device, or stored on a server 538, on the internet cloud. The device can access the server, with a connection to the internet. The server stores the user's pre-set settings. The server can have a web site, which allows the user to store their pre-set settings, on the sites server.

The device would use the user's identity, to search for the setting associated to the user, on the web site. The device and server communicate the user's identity. The server computer 538 finds a match with the user's identity, and the stored user identity settings. The server sends the user's settings, to the device. The device uses the received device settings in the operation of the device. The devices can use a wired 540 or wireless connection to the internet. The device could connect to the phone, and use the phones internet connection, to access the server.

Pre-Set Setting Active During a Time Period

Pre-set settings can be set to be activated during a certain time. For example, a user's elevator settings may be set within a time period, such as, if the time is between 8:30 and 9:00 am the setting would a request of an up elevator, and a setting of the elevator for the 4 floor. Store checkout machines 536 can use pre-set payment setting information, such as, paying with the purchase with a credit card. Smart toilet 534 settings may set the bidet water pressure to medium, within a time period of 1 pm to 7 pm.

Other devices could be used with the user's settings stored on them, and able to communicate with the device, such as, a radio frequency identification device (not shown) having stored user settings. The devices could store the user's settings, and activate the settings, with the identification of the user. The user's identity can be associated with settings stored, with the device, which are activated when the user is identified.

The user can be identified by facial recognition, eye recognition, and voice recognition, for example, the smart toilet 534, can identify a user using facial recognition, and set the bidet water temperature to medium. User identification can sent to the device from the phone.

Self-identification, self-input of identity such as, saying their name, can be used to identify themselves to the device.

The user can set the settings to be activated automatically, or manually. The manual operation could have the device, requesting the user, to send the device's settings.

An icon 514 of the device is shown on the phones display 512. The user would send the setting, by touch activating the icon 514. The phone could also be set, to notify the user of a device settings request, such as, the phone making an audible sound.

The user could also set the setting's to be turned off. The phone would communicate to the device, that no user setting should be activated, by phone or by other identifying ways such as, facial recognition. If more than one user setting is detected, the first detected user setting would be activated.

The phone can have setting for differing devices, such as, settings for smart toilets 534, elevators 532, room temperature, and cars.

Putting Settings on the Phone

On the users phone 516 the user can enter pre-set setting for differing devices. The device's setting would be used by devices in a group of devices. For example, setting for smart toilets would be used for toilets of differing companies, makes and models. A user's water temperature setting would be used for all the differing toilets.

The user could also specify that the water temperature setting, be used by a certain group of toilet and a different water temperature setting used with another group of toilets. The setting can also be restricted to the use of specific individual devices.

The user can pre-set a setting by choosing devices, from a catalogue of devices, shown on their phone. For example, the user could scroll to an image of a smart toilet. The user would touch the icon which would expand a menu of toilet and toilet bidet settings. The user would choose settings from the menu of toilet setting. The user would save the setting for the toilet. The setting would be used with the operation of the toilet.

If the device isn't in the menu the user can create their own device and device setting. The user could also search the internet, to find the desired device with settings and download it to their phone.

The phone could also remember the devices setting, when the user uses the device. The user uses the device, and the device remembers the setting, the user used when operating the device. The device communicates with the user's phone. The device would send the users setting to the phone.

The remembered settings could be used the next time the user uses the device. This reduces the need for the user to enter setting into the phone. For example the user, sets the electric adjusted seat firmness in a car, to medium. The phone remembers the setting, and the next time the user uses the car, if the seat setting is different than the setting the user used the last time, the phone sets the seat to the last used user seat setting.

The phone and device use computers, and computer languages which allow them to communicate. The phone and devices user radio waves which allow them to communicate, such as, WIFI direct, or Bluetooth. The phone and device could also communicate using infrared light.

The user can set the distance that the phone detects external devices. Limiting the number of devices detected might be used to decrease the choices available, which limits the distance that the user needs to travel to a device. The devices connection range to the phone may be limited, by the radio range of the transmitter. The location of the device may limit, the devices broadcast range, for example, a device located in a basement.

Setting Used for the Devices that are the Same

The phone can connect to more than one device at a time, and show the displayed devices on the phone's display, and send settings to the devices.

Figure 9:
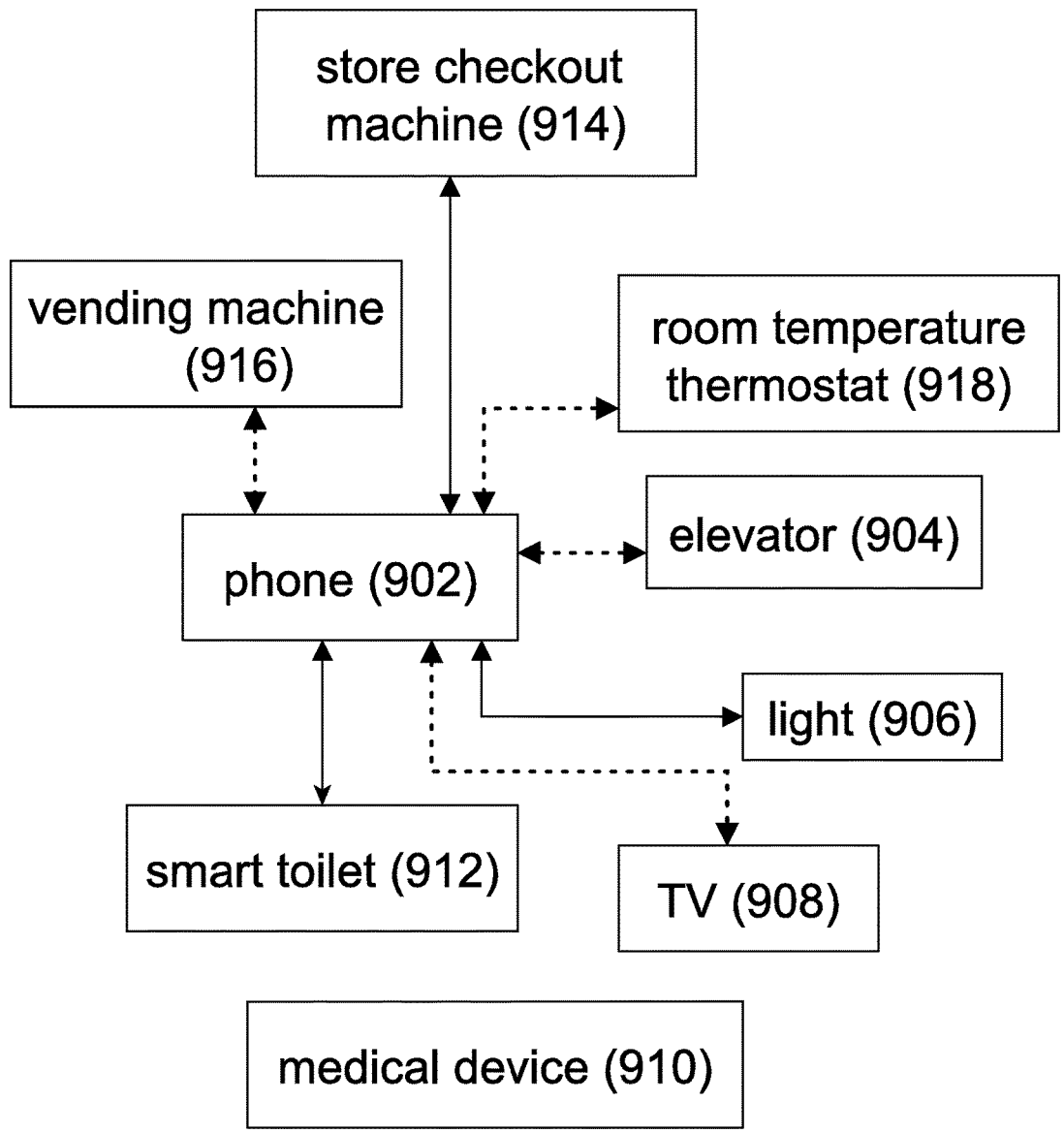
FIG. 9 illustrates a block diagram of hardware connections between a smart phone with stored device settings, and external devices.

Setting can be set for a group of devices, and have the setting used in the operation of the devices. The plurality of similar devices in the group can use the setting. The setting can used by devices made by different companies, different class, category, and style of device. For example, the user has an electric car seat setting of medium. The medium setting can be used, by car seats in cars, made by different companies, used in trucks, and used by as driver's seat or passengers seat, Block Diagram, and Software Flow Chart A block diagram shows the portable computer's and external device's possible radio wave connections. Solid lines show the portable computer and external devices are connected. Dotted line's show the solid lines show the portable computer and external devices are able to connect. The absence of connection lines show the show the solid lines show the portable computer and external devices are out of the connect area. The component connections are shown in FIG. 9, phone (902) elevator (904) light (906) TV (908) medical device (910) smart toilet (912) store checkout machine (914) vending machine (916) room temperature thermostat (918)

Figure 10:
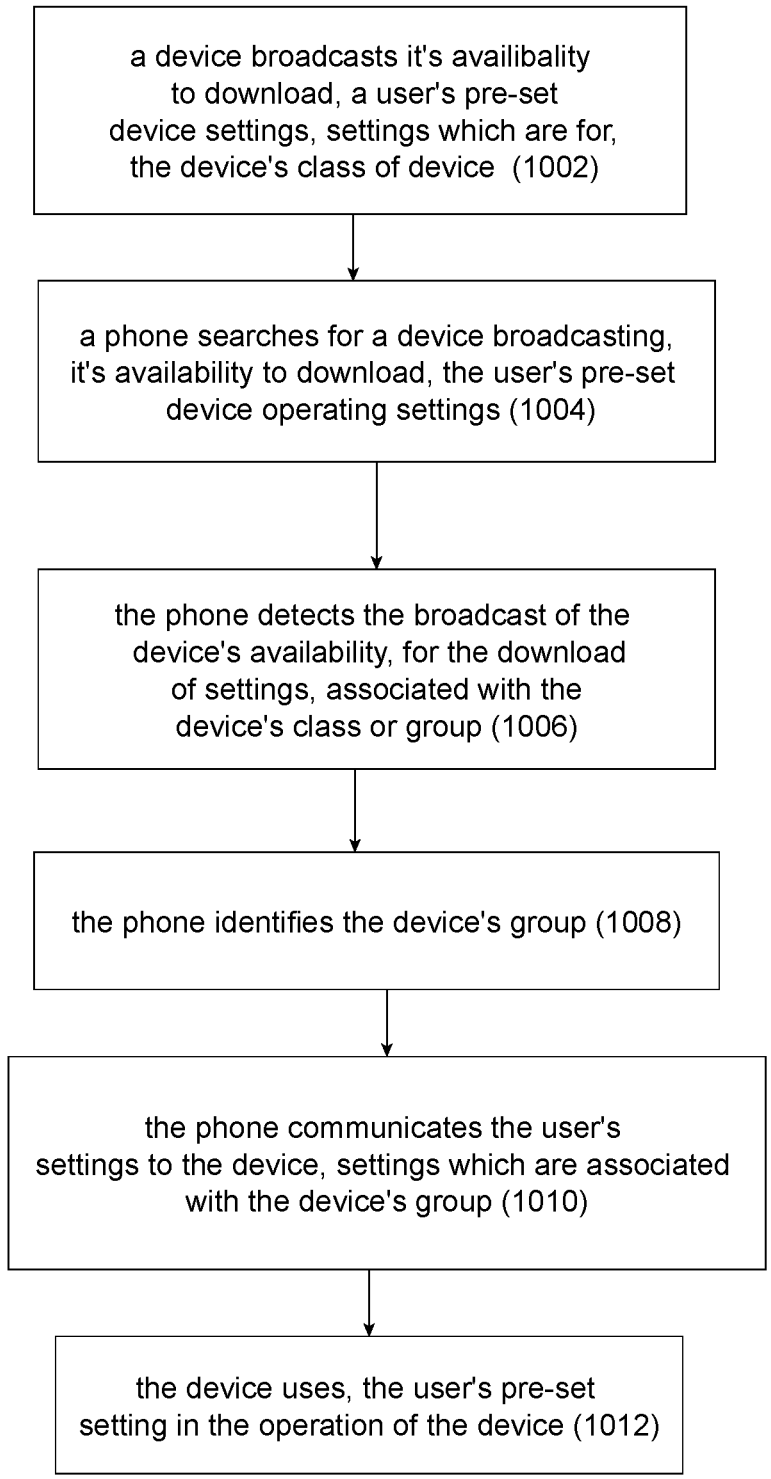
FIG. 10 depicts a flowchart of a smart phone with stored device settings, and an operation of external devices.

Software steps of portable computer and external device's operation, may include some of the following steps. In the device software and operation flowchart. The following steps illustrate the portable computer and external device's operation, as shown in FIG. 10. a device broadcasts it's availability to download, a user's pre-set device settings, settings which are for, the device's class of device (1002) a phone searches for a device broadcasting, it's availability to download, the user's pre-set device operating settings (1004) the phone detects the broadcast of the device's availability, for the download of settings, associated with the device's class or group (1006) the phone identifies the device's group (1008) the phone communicates the user's settings to the device, settings which are associated with the device's group (1010) the device uses, the user's pre-set setting in the operation of the device (1012)

Figure 16:
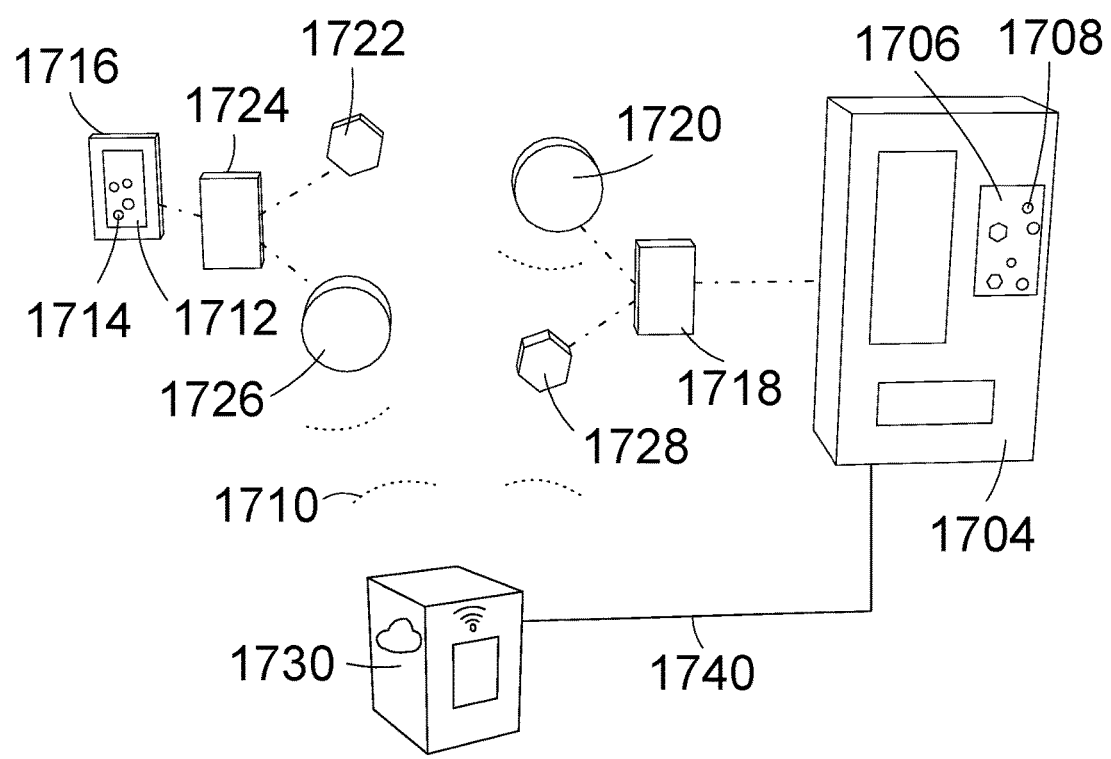
FIG. 16 shows a perspective view of a smart phone with stored device setting, connected to a vending machine, using a radio wave connection and or internet connection between the smart phone and the vending machine.

A Internet Connection Used in the Communication of Pre-Set Settings to a Vending Machine from a Phone Description and Operation A phone 1716 can connect to external devices, and download device settings, using the internet, shown in FIG. 16. The phone's location can be found using a portable computer global positioning system GPS, or cell phone location. The phone can be located on a computer internet map. The map includes the external devices locations. The map plots the location of the external devices locations. The phone and devices each has a software that allows them to know each other's location on the internet map.

The devices can communicate with the phone, connecting with the phone using the internet connection, and using internet communication. The devices can communicate their availability to download settings from the phone, when the phone is in the vicinity of the devices. The phone and external devices location can be tracked and plotted, on internet maps such as, Google Maps, or Microsoft Maps, to determine when the user is in the vicinity of the devices.

Sending Settings

The phone downloads, over the internet, differing device's pre-set user device settings, and uses a control panel display associated with one of the device's to operate the device, over the internet. The user input operates the device menu shown on the display. The phone uploads differing pre-set user device settings to differing groups of devices. The phone uploads the differing pre-set user device settings to the device, associated to that similar group of devices. For example the vending machine belongs to a group comprising vending machines. The vending machines may differ lightly from each other, thought they operate as vending machines.

The settings sent over the internet are used, to operate the device, and or input data into the device. The devices can have a wired or wireless connection to the internet. The phone being portable, would have a wireless connection to the internet.

The internet of things has been focused of the connection of devices to the internet. The connected devices can be monitored by other devices connected to the internet. Differing devices can have settings downloaded to them by the phone using the internet, when the user is in the vicinity of the device.

Connection Between the Phone and a Vending Machine

FIG. 16 shows the communication connection between the phone and a vending machine, by using an internet connection. The vending machine 1704 is connected to a computer 1718. The computer 1718 is connected to a radio wave transmitter 1720, and radio wave receiver. The machine connects to the internet router using radio WIFI waves or a wired connection. The machine can also connect to the router by wire 1740. The internet router is connected to the internet by wire. The machine's transmitter 1720 broadcasts a continuous signal 1710 to the internet router, that the vending machine 1704 is available for operation. The device can also connect to the internet using a cellphone microwave connection.

The Machine Broadcasts Settings Over the Internet

The machine broadcasts over the internet, communication of the vending machines availability to download pre-set user device settings associated to the device, when the phone's is in the vicinity of the machine.

The phone is connected to a computer 1724. The computer is connected to a receiver 1722, and transmitter 1726. The phones connects to the internet wirelessly, using radio WIFI waves 1710, or cell phone microwave. The phone is able to communicate using the internet by downloading and uploading internet data.

The phones searches the area using the internet, to find machines broadcasting their availability for download of pre-set user device settings. The phone's receiver automatically downloads the machine's request for device setting over the internet, broadcast by the machine on the internet 1720.

The phone's computer 1724 sends the user's machine device settings information to the phones transmitter 1726, which broadcasts the user's settings information to the internet, and to the vending machine connected to the internet 1728. The vending machine receives, downloads the user pre-set user device settings over the internet, broadcast by the phone. The machine sends the received user input information, to the machine's computer. The machine's computer uses the user pre-set user device settings, in the operation of the machine. The machines sends the phone, information concerning, the user's pre-set settings, used in the operation of the machine.

Phone's Display

The phones display 1712 shows icons 1714 of the devices which are available to download the phone's device settings, over the internet. The icons show which devices, have downloaded the pre-set user setting. The user can also manually download the devices setting to the device, by touch acting the icon describing the device, which is associated with the vending machine or other devices, over the internet. The devices can connect to an internet router 1730, the router connects to the internet, using a wired 1740 and or radio wave 1710 connection.

The machine's display is similar to the phone's display The vending machine input icons 1708 allow the user to touch input operate the machine. A vending machine operating control panel with input icons 1708 is shown on the machine's display 1706.

The device's transmitter and receiver communicate over the internet with the phones transmitter and receiver using radio waves. The phone communicates with the device over the internet, using radio waves which are created by the phones transmitter. Devices which already having internet communication devices, such as smart toilets, may only need software, that enables the phone, to connect and communicate over the internet with the device.

Smart Glasses Used to Operate Public Devices Description and Operation

Personal computing devices can operate, detached devices hygienically.

Figure 12:
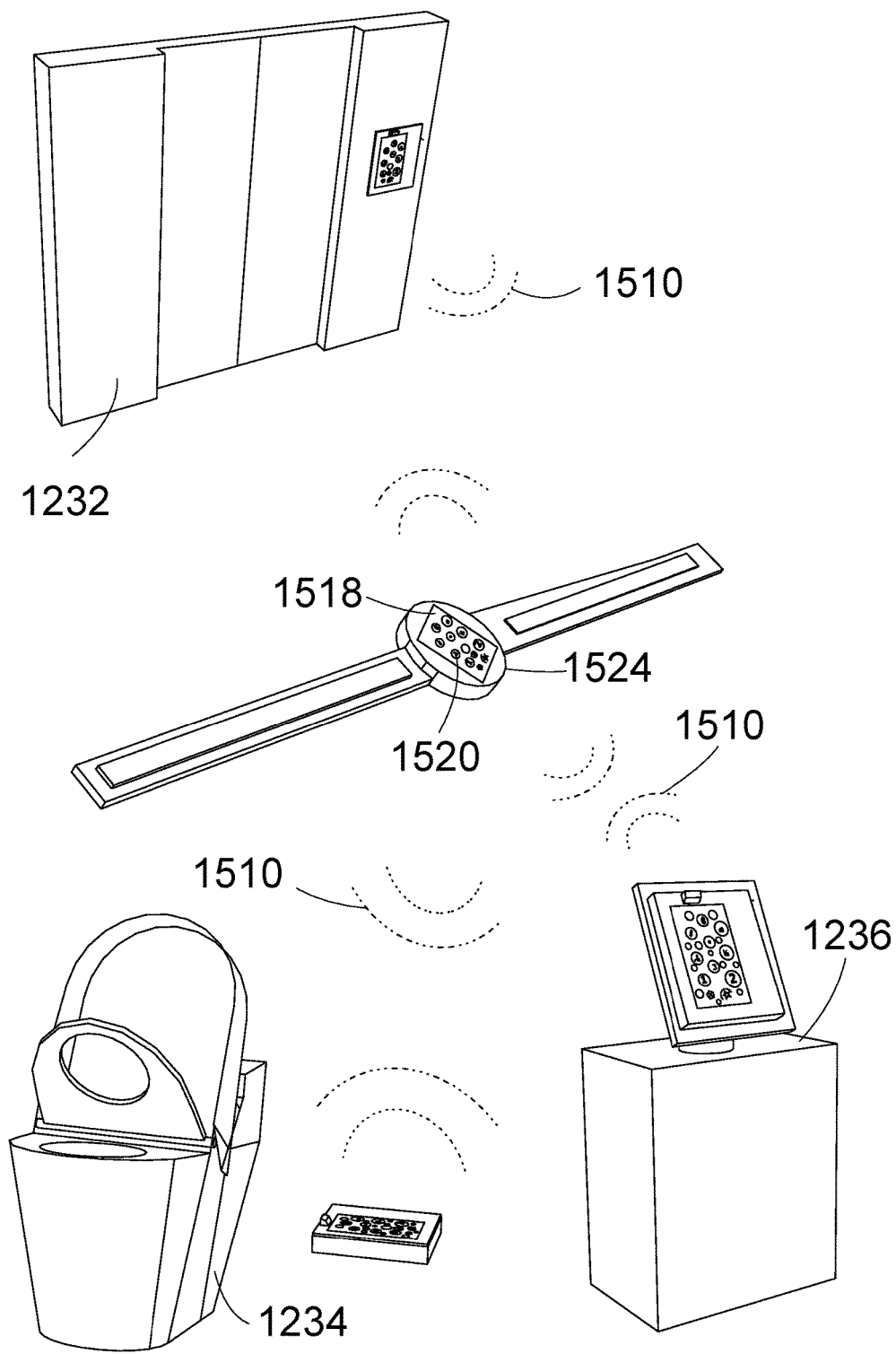
FIG. 12 shows a perspective view of a smart glasses, a radio wave connection between the smart glasses, and devices including, an elevator, a smart toilet, and a store checkout machine.
Figure 14:
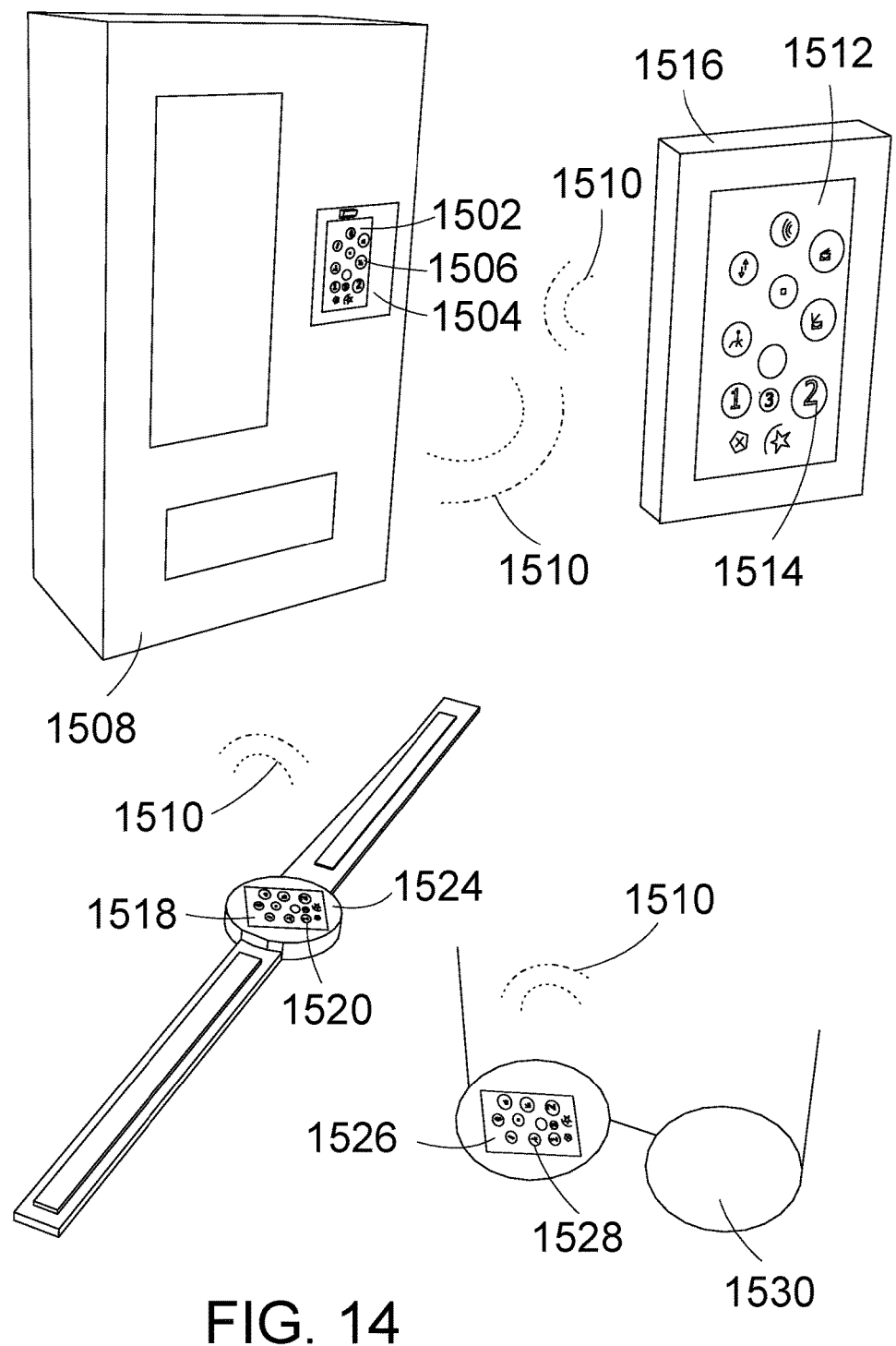
FIG. 14 shows a perspective view of a smart phone, a-smart glasses and a smart watch, wirelessly connectable to a vending machine.

A smart phone 1516, tablet, a portable computer, a computer smart watch 1524, or a smart computer eye glasses' 1530, can be used to operate public interactive devices, 1508, as shown in FIGS. 11, 12 and 14. Public interactive device may include electronic devices, such as automated teller machines ATMs, hotel doors locks, store pay checkout stations 1226, vending machines 1508 station gas pumps, space station devices, toilet remote controls 1234, flammable environment devices, medical devices, elevators 1232, and space station devices.

The watch, smart phone, glasses can connect to the electronic devices using Bluetooth 1510, direct WIFI, or other radio means of communication. Infrared communication could also be used between the user's portable device, and the electronic device. The phone, glasses, or watch displays are used to input data to the connected device, to operate the device.

The portable computer device can connect to a multitude of differing public, or private devices. The various devices have a common radio communications procedure with the portable device, which allows the devices to communicate with the portable device the public devices. The portable device communicates with the external device automatically, when they are within range, proximity to each other.

When the portable device, and the external device are connected, with each other, the external device's, electronic operating panel visual display, is automatically downloaded to the portable device.

The devices communications proximity may be 5 to 8 meters. The device and portable device's automatic communication is a pre-set radio protocol. The distance which the portable connects to the device, can be set by the user of the portable, or set by the devices operator. The distance which the portable and the device can connect can be far, for example, 100 meters or more, or close less than 3 meters.

The portable device can communicate individually with a variety of public devices, for example, a user may use a smart phone, to operate an elevator. The user then goes to an ATM, after operating the elevator, and uses the phone to operate the ATM. The user puts funds on their phone, from a withdrawal from the ATM. With funds from the ATM on the user's phone, the user goes to the vicinity of a vending machine 1508.

The user operates the vending machine, by touch imputing the vending machines menu display, which is automatically displayed on the phone. The user pays the vending machine, with funds have been downloaded to the phone, and which are displayed on the phone 1516, and are touch inputted to the vending machine. The funds are transferred to the vending machine, by the approval of the user.

The user can also pay, by directly removing funds from their bank account, which can be displayed on the phone. The user could also use a PayPal account, or credit card information on the phone, to pay for the vending machines products. The user can then buy merchandise at a store, and pay for the products, with the phone, at the store checkout machine.

The portable device, and public device, has a computer software that allows them to communicate and operate, with each other. The software allows for the transference, download of operating panel displays, from the external devices to the portable device. The portable devices, such as, the watch automatically connects, to the device, when the user is within a predetermined range, of 0.5 meters to 72 meters depending on the type of device, and closeness to other devices. When the user connects with the device, information can be exchanged between the devices, such as, the user's user identification information.

The devices input panel display, can be sent, to the watch and displayed on the watch's display 1518. The user can use the devices displayed icons 1506 which are displayed on the device's display 1502 operating panel 1504, and on the watch 1520. The watch display touch input icons, can be used to touch input to the device. The touch inputs can be sent to the device, as touch inputs of the icon functions. The display on the watch can be the same or similar the devices display. The watch display acts as a secondary input panel, as shown in FIGS. 12, and 14.

Also some devices, can use the watch displayed touch icons 1520, as the only or primary input panel for the display, such as, a display for a smart toilet. The display could also be non-touch input, such as, voice recognition input, mid-air gesture recognition input, but use a touch pad operating a displayed cursor to active displayed icons. Display icon, icons, text, symbol, and scrolling data choices, can be displayed on the portable devices, and used to display a menu of a connected devices functions. The user can choose from the icons, or scroll a menu of choices, to activate the various device's functions.

Google glasses 1526, can display 1526 a device's icons 1528, and can be used to connect to and operate an electronic device, such as the vending machine 1508'.

The watch could show the input screen of the ATM. The user can input data to the smart phone such as, pin number, ATM services, such as, withdraws deposits. The ATM's display, displays on the watch's display, or a display similar, to the ATM's display, is shown on the watch display.

The phone 1516 has an automatically downloaded input display from the elevator, with the display 1512, displaying touch input icons 1514 similar, to the elevators display. The downloaded display, is, could be used to operate the elevator.

For example, the user is near the elevator. The phone connects, to the elevator computer. To use the elevator 1232, the user presses the up button on the phone display. The elevator up button is illuminated on the elevator panel, and on the phones displayed up button 1514.

The elevator door opens, the user enters the elevator. The user presses, the desired second floor number 2 button icon, on the phone. The elevator panel illuminates, the number 2 button. The elevator computer, receives instruction from the phone, to move to the second floor. The elevator follow the instructions, and moves to the second floor. The elevator doors open apron arrival, the user exists the elevator.

The google glasses 1530 can use a Tobii eye tracking and eye gesture recognition sensor (not shown),) connected to the computer and programmed with Tobii software, to operate the external device's input panel 1528, 1530 displayed on the glasses lens. The eye sensor is attached to the glasses, and views the user's eye or eyes. The user moves a cursor, on the display 1528, 1530 by looking at where they want the cursor to move to. The user controls the cursor, and chooses toilet menu options, by positioning the pointer over the desired menu option 1528 on the display. A tool bar is displayed for operating the cursor. The tool bar has commands, such as, right click, left click, scroll, zoom, save.

The user's eye movements moves the cursor to an icon 1528, which highlights the icon. The users continues to look at the icon. A displayed timer shown with the cursor, shows that the icon with activate after a predetermined time, of the user looking at the icon, such as, the icon with activate in 1 second. An eye movement sensor tracks the user's eye movement. The user looks back at the cursor and the cursor double clicks the icon, as illustrated in FIG. 14.

The transference of bacteria and viruses, from public operating panels, is limited to the users contacting their own bacteria, on their own phone. By touching their own device, the user only contacts bacteria, by users of the phone, which may be limited to themselves.

The user can pre-set their input information to the device, such as, the user pre-sets an elevator floor of 3, into their cell phone. The user move into proximity, with the elevator. The cell phone detects the elevators radio waves, and connects to the elevator. The elevator receives the automatic request, to transport a user. The up button illuminates. The elevator arrives, to transport the user. When the user enters the elevator, the pre-set 3 floor request is automatically sent to the elevator. The elevator 3 floor request lights up, to show its activation request.

The user can create, pre-set a user profile with pre-set settings stored on their portable computer. The settings profile can be used for a variety of devices, such as, smart toilets, automotive car setting, room temperature settings, and room light settings.

The users pre-set profile setting could also be stored on the internet, on a server, on the internet cloud. A user can be in the vicinity of a device. The user's portable computer connects to, and communicate with the device. The user's identity and address on the internet, can be sent, to the device. The device can have a connection to the internet, and can look up the user's profile, and device settings on the internet. The internet settings can be used by the device, to set the device to the user pre-set settings.

Toilet settings could include, bidet water temperature. Car settings, could include a radio station frequency, or the height of an automatically adjusted car seat.

If the portable computer connects to two or more external devices, at the same time, the display will show the plurality of devices that it has connected to. The user can choose, which the device, which they choose to operate, by touching the displayed device icon, on the portable computer display.

The user can set the portable computer, to manually, connect to a device, by turning off, the portable's automatic connecting, to an external device setting. The user could then be in the vicinity of the desired device, to be operated, and turn on the portables wireless receiver, to search for an external device. The portable would show what devices that are available for connection, to the portable device that the user is in proximity too.

Figure 13:
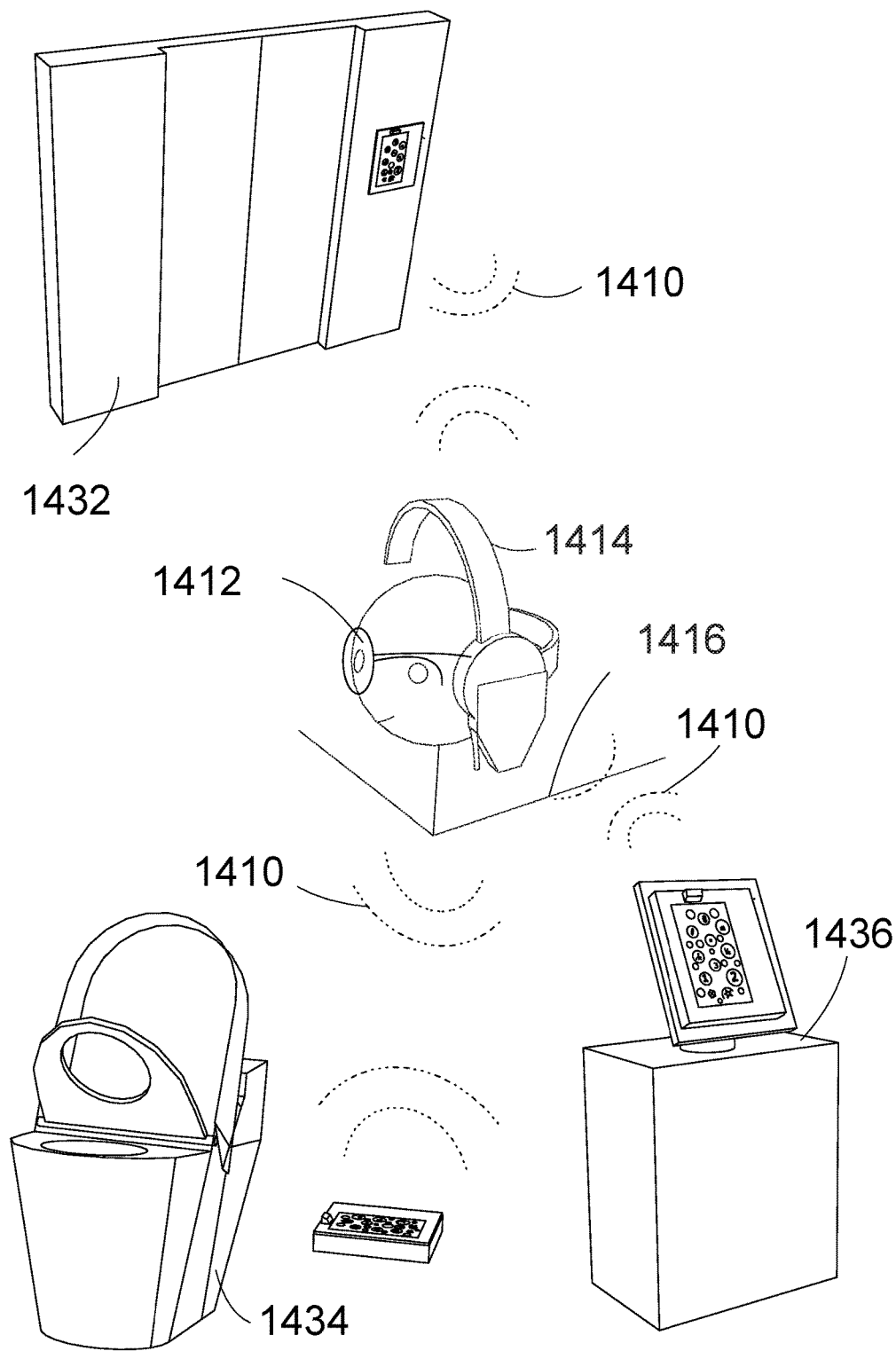
FIG. 13 illustrates a perspective view of a smart glasses and brainwave head set wirelessly connectable to other an elevator, a smart toilet, and a store checkout machine.

A Brain Wave and Thought Monitoring Headset Brain Wave and Thought Monitoring Headset Description and Operation A Neurosky brain wave and thought monitoring headset 1414 made by the Neurosky Company shown in FIG. 13, can use thoughts, to activate a device's function icons. The headset can be connected to a Google Glasses 1412. The headset and glasses can display the devices operating panel.

A user can use thoughts, to activate a displayed icon. The activated icon, can operate, a function of a device connected to the glasses. The headset wirelessly signals the computer, to operate the displayed device function icon, displayed on the google glasses.

The thoughts could be associated, with the activation, of displayed smart toilet device function icons. The thoughts are associated with certain brain waves; the certain brain waves, are associated with commands, for the operation displayed toilet devices. The user 1416 could also operate, a connected medical device 1436. The user could manually choose one of the external device's to download their operating menu, to the portable device.

The user wearing the headset on their head, can think elevator 1432 up, and an elevator up icon's, shown on the glasses, luminosity will increase its brightness. The user thinks 'yes', the elevator up icon is activated, the elevator moves to pick up the user, going in the up direction.

The user can use the headset and the glass display together, to control the smart toilet's bidet devices 1434. toilet devices. The glasses can use eye tracking and eye gesture recognition, to operate the glasses external devices operating panel, displayed on the glasses. The glasses track the users, eye movements. The user's looks and the icon they want to activate. After a predetermined time of 1 second, the icon activates. The activated icon signal is sent to the device, to operate a function of the device.

Alternately the user can use brain thoughts, to create brain waves, such as, the user moves their tongue and the electrical brain signals associated with moving their tongue will increase the luminosity of a bidet 1434 4034 front wash icon. The glasses and headset, connect to the devices, using radio wave 1410.4010. The brain wave head set can use an avatar to activate displayed icons by moving the cursor to the desired icon to be active, the user then thinks yes and the icon is activated. The communication between the portable computer and the device computer uses a compatible computer communication language.

Additional Alternate Embodiments

Figure 17:
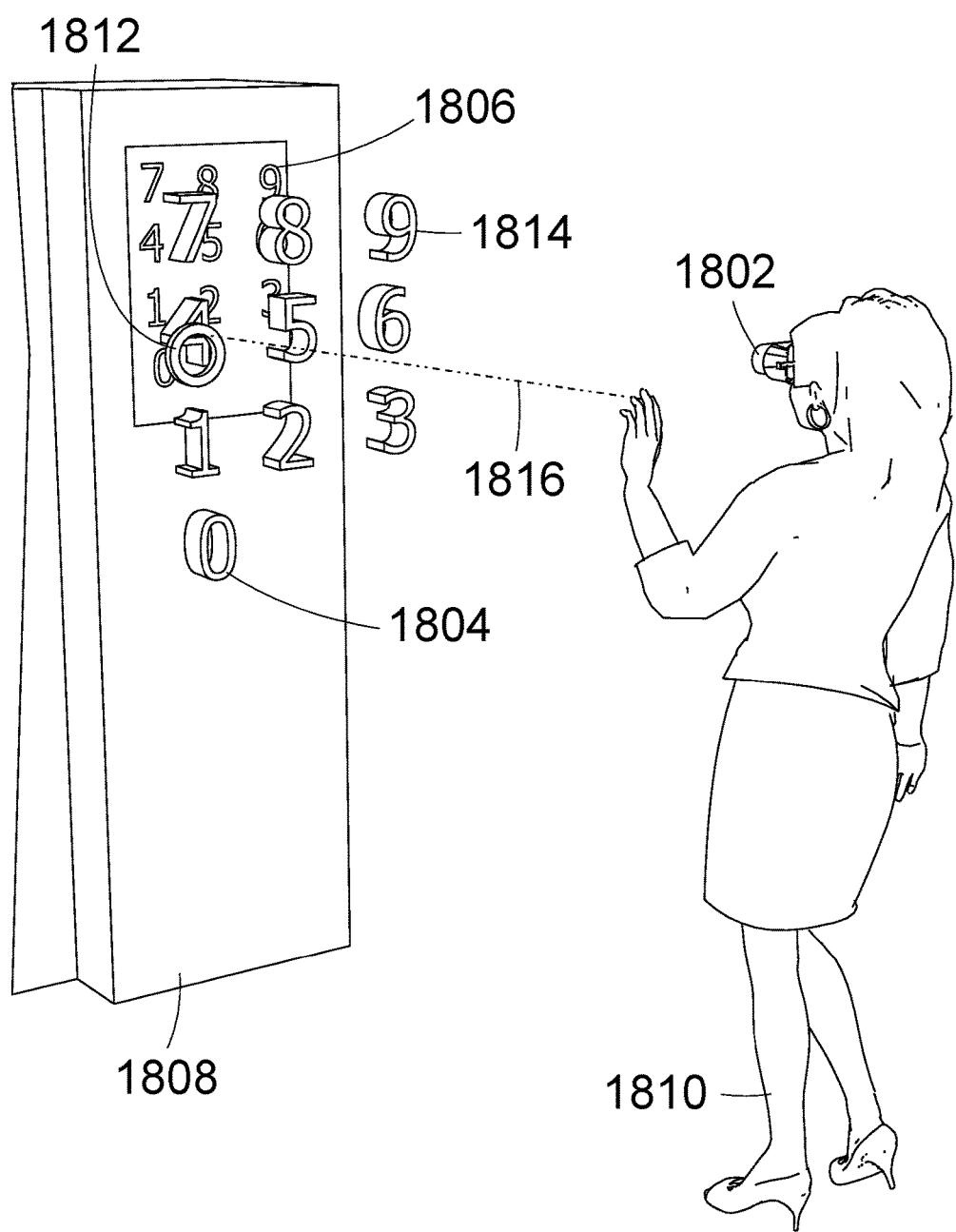
FIG. 17 show a perspective view of a holographic glasses mid-air touch input display and holographic glasses.
Figure 18:
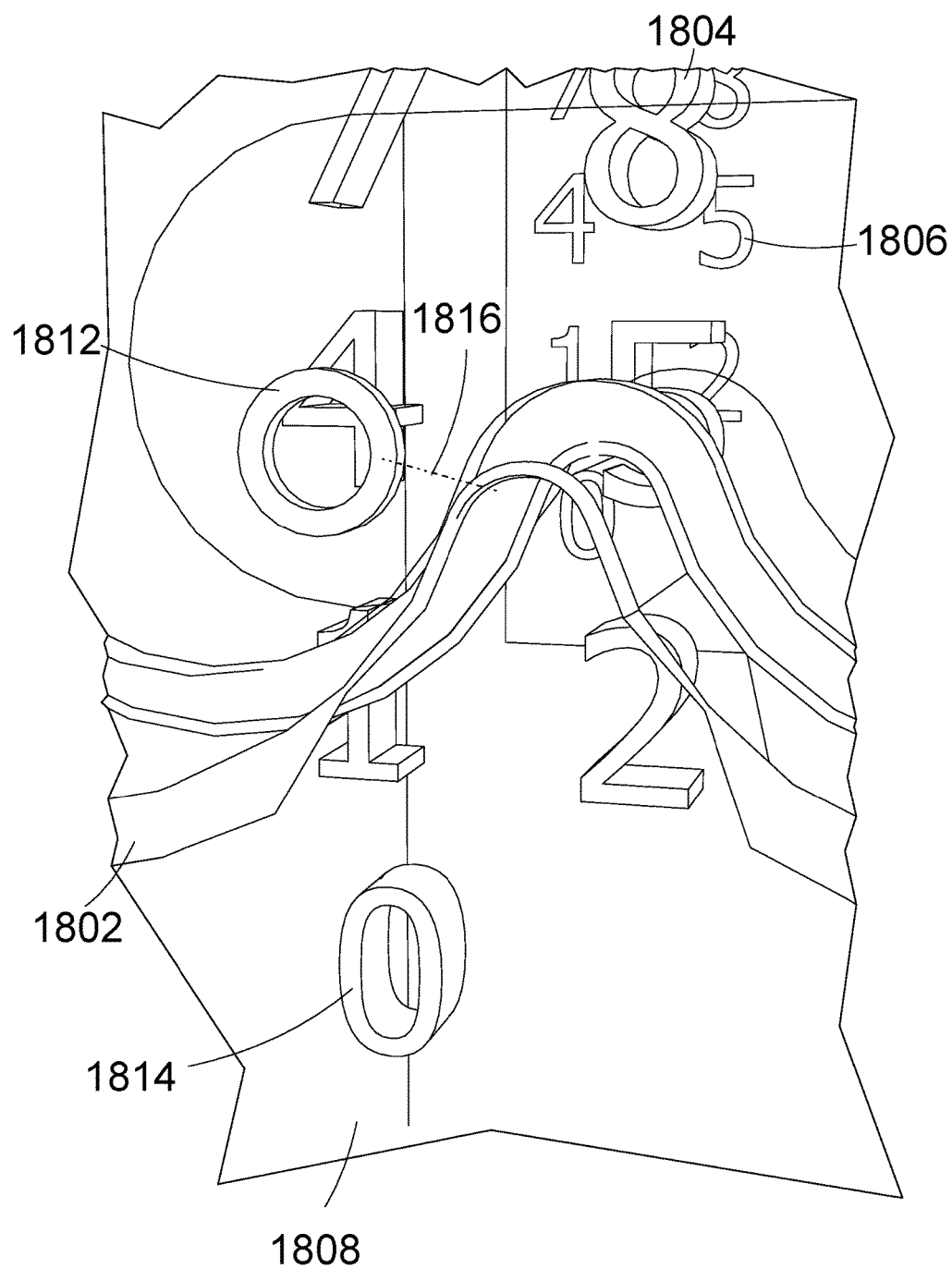
FIG. 18 show a perspective view of and a holographic glasses mid-air touch input display and the inside of a holographic glasses.

Holographic Glasses Used to Operate Devices Description and Operation holographic reality headset glasses called, Hololens 1802, made by the Microsoft Company, shows a holographic reality touch input panel 1804 in mid-air, operates a device, an elevator 1808, associated to the input panel, as illustrated in FIGS. 17 and 18. A user moves their hand to direct 1816 a mid-air cursor 1812 to the icon 1814 they want to activate. The cursor follows 1816 the user's hand movements over the mid-air display. A user's hand 1810 gestures, vocalization, thought brain waves, or eye movements can input one of the icon or icons, of the input control panel in mid-air air, to input in to the control panel. The user's hand gesture input of one of the icon's, on the input panel, influences the operation of the device, associated with the input button.

The user's glasses can communicate, and operate external devices. External devices broadcast, their control panels to the glasses. The glasses receives the broadcast, when they are in reception range of the broadcast. The glasses receive the control panel, which is then displayed on the glasses display. If there is more than one external device shown, the user can decide which external device they want to operate. The user operates the external device, by inputting into the external devices displayed control panel. The mid-air display can be a representation of a psychical input display 1806.

The glasses allow the user to see holographic objects superimposed on their surroundings, and also view their surroundings. The user looks though the glasses, and views the holographic objects displayed on the glasses.

Also when the user looks at a device, the glasses ask the device for its operating control panel. The device sends the device's operating menu to the glasses, and the devices operating input menu will be displayed, on the glasses. The menu can stay pinned, to a position associated with the device. The menu is displayed on the glasses lens, and gives the user the illusion that a holographic menu is floating in mid-air. The user inputs an icon of the displayed holographic menu, by using mid-air hand gestures, or vocal commands, to activate a chosen input icon of the menu. The glasses allow the user to operate devices, without touching them. The devices and the glasses communicate wirelessly, with, Bluetooth, or direct WIFI.

The glasses headset 1802 maps the room, and the device and displays the holographic control panel 1804, which operates the device, 1 meter from the devices physical control panel. The user can change and set the distance the control panel is from the devices control panel. The holographic control panel can be operated independently of the devices location, for example, an elevator call control panel, can be operated 5 meters for the elevator control panel, and out of view of the physical panel 1806. The user 1810 would call the elevator using the holographic call panel. Some devices could rely solely on the holographic panel for operation, without having a touch screen input control panel 1806.

Many devices holographic menu can be displayed with in close proximity to each other, such as, a vending machine menu, the elevator call button, an automatic teller machine, in the same room.

The glasses can be used to interact with other users who also have the glasses. For example, the first user can play holographic tennis in a room with another second player's holographic player, by receiving the second player's holographic image player over the internet. The second player would receive the first player's holographic image. The players view a tennis court with the other player and tennis court, visually proportioned to look like the tennis court is in the room. The first user can hold a holographic graphic tennis racquet, and hit a holographic tennis ball to the second player, who hits it back to the first player in the room. The players can continue hitting the ball back and forth, or miss hitting the ball, as if they are in a physically real tennis game.

A user created avatar of themselves, can be influenced by the viewed movement on the glasses on the user. The detected viewed movement of the glasses, is converted into movement of the avatar. As the user moves their avatar moves the same as the user. Other users with glasses view other people's avatars moving, over the internet. For example, a first user with glasses sends their avatar to a second user with glasses, when the first user moves the first user's avatar moves, and the avatars movements are viewed by the second user, and vice versa. The first user's avatar can also verbally speak to the second user. The second user and first users interaction with each other is the same for each of the users. The users can interact visually, and verbally, Separate cameras could also be used to view each user. The images, can create an avatar. The user images, avatar and movement of the images of themselves, can be send sent the other users glasses.

A real tennis racket can be used, with haptic feedback that that gives the feel of a real ball hitting the racket when the holographic tennis ball hits the racket. The game can be played outside or in an area large enough to pin a life size holographic tennis court the area, and the players can play holographic tennis which each other. Other sports, and multi-player events can be played holographic ally.

The HoloLens glasses can use gestures to create, shape, and size holograms. The glasses can use the user's eyes to navigate and explore. The glasses can use the user's voice to communicate with the user's applications. The glasses understands the user's movements, vision, and voice, enabling them to interact with content and information in the most natural way possible.

The Hololens can use an eye tracking and eye gesture recognition sensor, connected to the computer and programmed with eye tracking software, to operate the external device's input panel displayed on the glasses lens. The eye sensor is attached to the glasses, and views the user's eye or eyes. The user moves a cursor, on the display by looking at where they want the cursor to move to. The user controls the cursor, and chooses toilet menu options, by positioning the pointer over the desired menu option 1528 on the display. A tool bar is displayed, for operating the cursor. The tool bar has commands, such as, right click, left click, scroll, zoom, save.

The user's eye movements moves the cursor to an icon which highlights the icon. A displayed timer shown with the cursor, shows that the icon with activate after a predetermined time, of the user looking at the icon, such as, the icon with activate in 1 second. An eye movement sensor tracks the user's eye movement. The user looks back at the cursor and the cursor double clicks the icon.

A Brain Wave and Thought Monitoring Headset Connected to Holographic Glasses Description A Neurosky brain wave and thought monitoring headset 1414 shown in FIG. 13, can use thoughts, to activate a device's function icons. The headset can be connected to a Hololens glasses 1412. The headset and glasses can display the devices operating panel. A user can use thoughts, to activate a displayed icon. The activated icon, can operate, a function of a device connected to the glasses.

The headset wirelessly signals the device's computer, to operate a displayed device function icon, displayed on the Hololens glasses. The thoughts could be associated, with the activation, of displayed smart toilet device function icons. The thoughts are associated with certain brain waves; the certain brain waves, are associated with commands, for the operation displayed toilet devices.

The user could also operate, a connected medical device. The user could manually choose one of the external device's to download their operating menu, to the portable device.

The user wears the Neurosky headset on their head. The user can think elevator up, and an elevator's up icon, is shown in mid-air, and its luminosity will increase its brightness. The user thinks 'yes', the elevator up icon is activated. the elevator moves to pick up the user, going in the up direction.

Alternately the user can use brain thoughts, to create brain waves, such as, the user moves their tongue and the electrical brain signals associated with moving their tongue will increase the luminosity of a bidet front wash icon.

The glasses and head set, connect to the devices, using radio wave. The brain wave head set can use an avatar to activate mid-air icons by moving the cursor to the desired icon to be active. The user then thinks yes, and the icon is activated. The communication between the portable computer and the device computer uses a compatible computer communication language.

Holographic Glasses can Use Eye Tracking and Eye Gesture Recognition

The user can use the headset and the glass display together, to control the smart toilet's bidet devices. The glasses can use eye tracking and eye gesture recognition, to operate the glasses external devices operating panel, displayed on the glasses. The glasses track the users, eye movements. The user's looks and the icon in mid-air that they want to activate. After a predetermined time of 1 second, the icon activates. The activated icon signal is sent to the device, to operate a function of the device.

Figure 19:
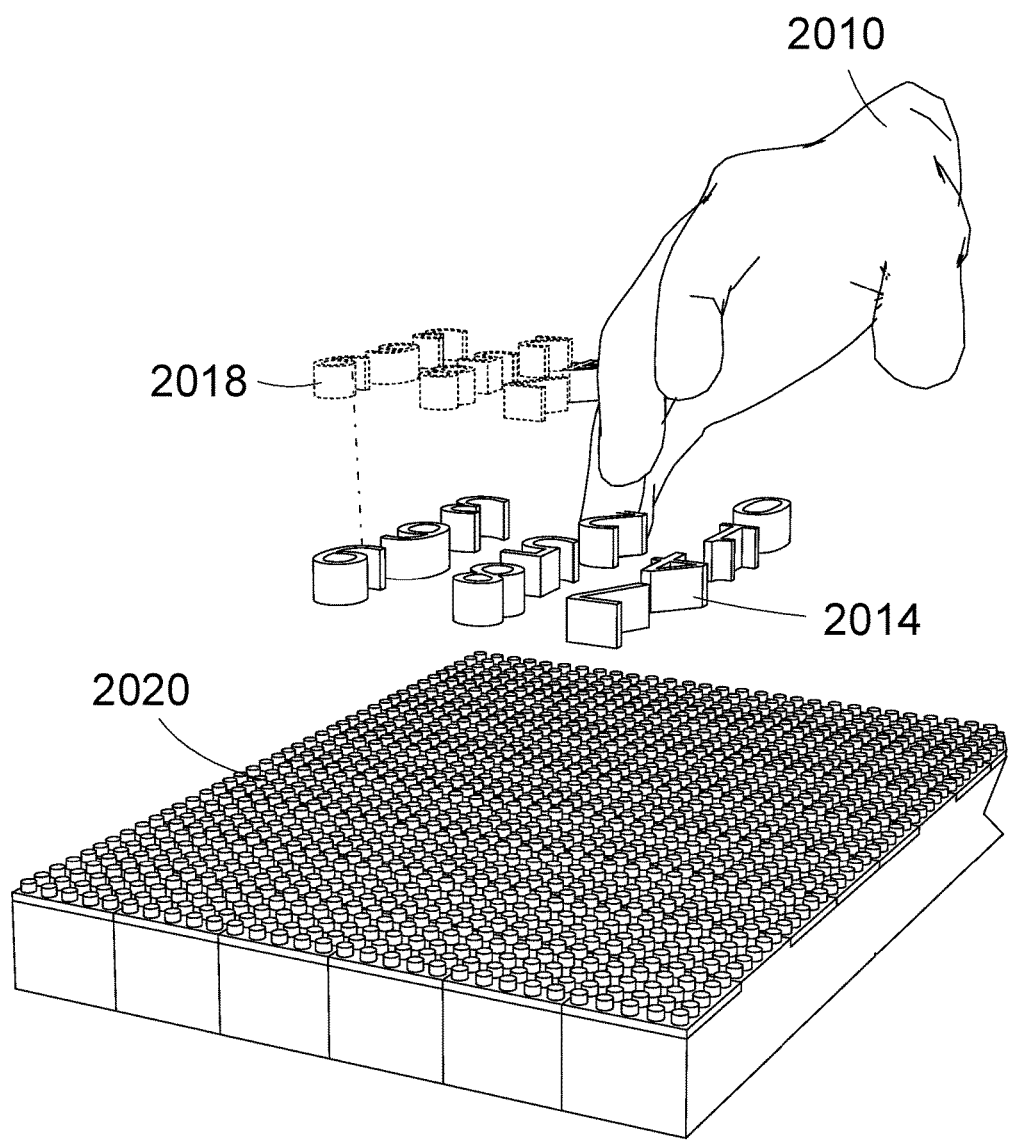
FIG. 19 show a perspective view of a holographic glasses mid-air touch input display, and a mid-air haptic touch transducer array.

Holographic Glasses and Holographic Mid-Air Input Icons with Mid Air Haptic Touch Feedback Description and Operation A user 1910 with holographic glasses, views mid-air touch icons 1914, located near a mid-air touch producing transducer array 1920. The array creates mid-air touch shapes 1918 that are the same shape as the holographic icons, and occupy the same space as the holographic icons. Mid-air haptic touch in the same location as the holographic icons, allows a user to feel the touch associated to the visible mid-air icons, when they touch the icons in mid-air, as illustrated in FIG. 19.

The feeling of touch, when touching a mid-air icon, helps the user, know when their touch of the mid-air touch icon, has activated the icon. Mid-air touch lets the user know they can stop the forward movement of their finger, when touching the icon. Mid-air touch adds another sensory feedback to the user's interaction with the control panel. Mid-air haptic touch producing transducers are located to direct mid-air haptic touch to the different input icons.

To receive different mid-air touch associated to the different input panel icon, the holographic panel is within a distance that the transducers can create mid-air touch.

Figure 20:
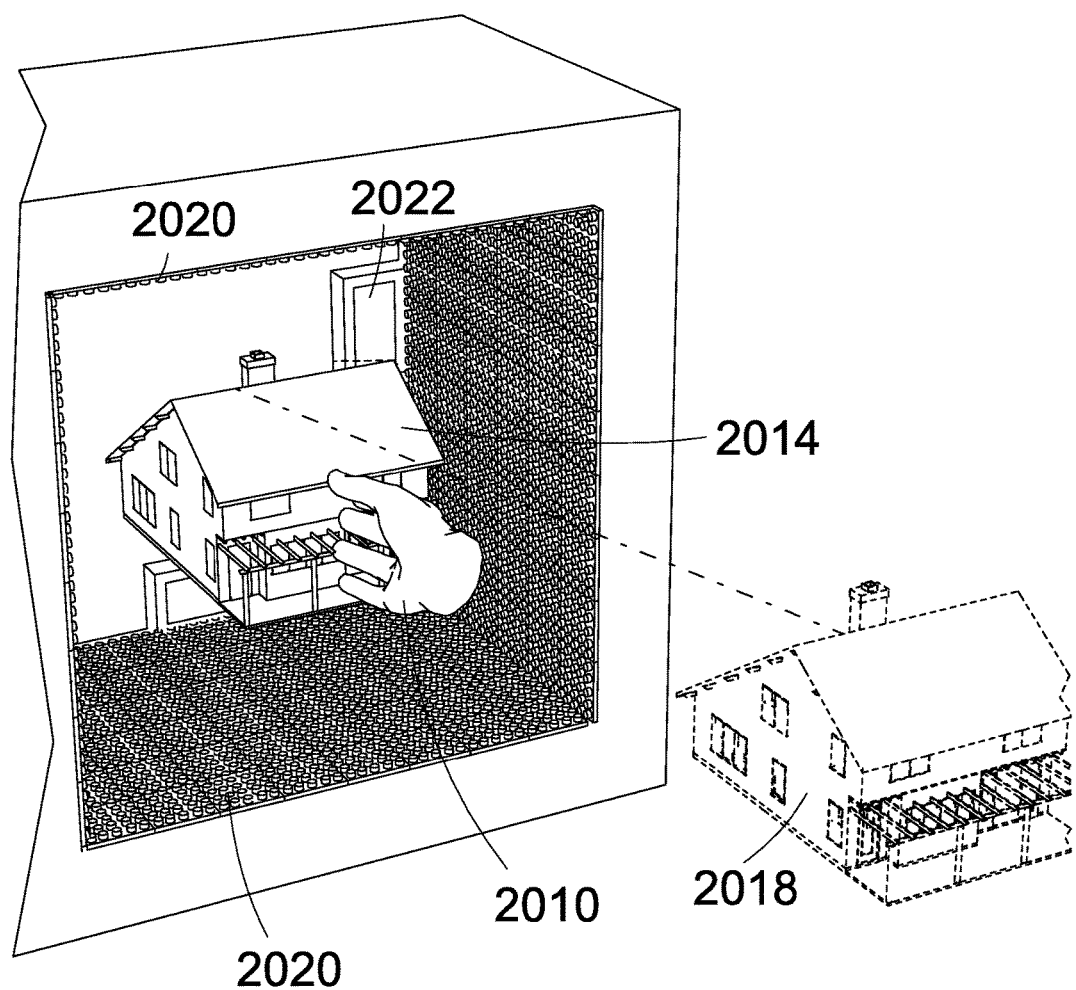
FIG. 20 show a perspective view of a holographic glasses mid-air touch image, and a mid-air haptic touch transducer array.

Holographic Glasses and Holographic Objects with Mid Air Haptic Touch Feedback Description and Operation A user 2010 can pick up a holographic image object 2014, and move it to a transducer array 2006, as illustrated in FIG. 20. When the imaged is placed in the array, transducers 2004 create mid-air haptic touch 2018 which occupies the same space as he holographic object. The holographic object 2018 has mid-air touch that can be felt when touched it in mid-air, when the mid-air touch is in the same space as the holographic object.

A glasses headset computer (not shown) is connected to a computer which is connected to the transducers, and sends the image information about the objects location relative to the transducer array, to the transducer computer. The computer creates the mid-air touch shape of the object in the same mid-air location as the object. The mid-air touch shape follows the movement of the object. The shape can be felt as the object is moved.

Four gesture recognition sensors, cameras 2022 are connected to a computer. The sensors have a view of the user near the arrays.

Five arrays are connected, to the computer. A bottom array creates a top mid-air feeling for the object. The arrays projects the ultrasonic energy out from the array, which creates a mid-air haptic touch feel perpendicular from the face of the array.

A top array creates bottom feel of the object. A left and right array creates the left and right touch sides of the object. A back array (not shown), creates a front feel of the object. A combination of bottom array, back array and left side array can be used to create feeling for the object. Different combinations of the arrays mid-air touch can be used to create mid-air feel for the object. All 5 arrays also can be used to simultaneously create feeling for the object.

The computer is programmed with mid-air touch creating shape software, holographic reality software, visual image and mid-air touch shape movement synchronization software, mid-air hand gesture recognition software, and computer operating software.

The holographic glasses and the haptic touch transducer array 2020, are connected to allow the user 2010 to view 3D objects, holographic images on a displaying the headset. Mid touch mid-air ultrasound created shapes are associated to and similar to the holographic images, when viewed through the headset. The holographic reality headset is used to view holographic images, as illustrated in FIG. 20. The displayed holographic images, holographic objects are located near a transducer array. The holographic glasses are called Hololens glasses.

The computer first creates the visual holographic objects and secondarily creates haptic touch in mid-air to add touch feel to the objects. The computer could also reverse the creation of the touchable holograms by first creating the mid-air touch shape, and then super impose the displayed holographic object on the mid-air touch shape. The computer could also simultaneous create the visual objects, and mid-air touch shape. The touch shape moves in sync with the visual virtual reality, holographic shape's movements.

The headset can view stationary and moving holographic objects, located in the real world. The user can use their fingers to interact with and touch the holograms 2018, such as, moving them, feel the associated mid-air haptic touch shape 2014. The user can feel their movements, and feeling their weight.

The user can interact with other user's avatars over the internet. The user can feel the other user's avatars, by positioning them near the array. The users can touch each other avatars and simultaneous receive, touch and visual feedback.

The Hololens glasses maps 3D spaces of rooms, which avatars can move in, view, and interact in the room. Sculptures and objects can be created by changing the shape of a pliable object by changing the shape of an object in mid-air with the user's hand. Environments can be created where user created objects are displayed and touchable by other users.

The holographic reality displayed environment can be limited to the area near the arrays. The user can touch and feel objects, move objects, zoom in and out on objects, enlarging or making the object smaller, changing the shape of objects, cutting objects, and combining objects.

The displayed environment can also be the area outside of the array, with the array used for creating mid-air touch for objects that can be placed near, the array, by the user picking up the object and place it near the array.

The mid-air touch is associated to what is near the array, for example, if a strawberry is receiving mid-air touch, the user can touch the whole strawberry, if the strawberry is enlarged to where only a portion of the visual strawberry is near the array, the user can touch the part of the strawberry near the array. The feeling of the strawberry would change to that of what the enlarged strawberry would fell like.

The user's hand, or other body part can be used to interact with 3D visual mid-air touch objects. The hand is able to touch and feel objects, move objects, zoom in and out objects, enlarging or making the object smaller.

The user can inputs commands on a keyboard, or use mid-air hand gestures, to change the shape of an object. The user activates an object shape changing mode, the object can stay stationary, and the user can use the avatar to contact and pull or push the object, to indent, compress, or pull, or elongate an area of the object.

A display menu can show a menu of display functions. The functions can be activated by touching the function with a user movable avatar.

In object material removing mode, material can be added or removed, from the object, detaching it from the object. To change the objects shape, detached material can be add by replacing it the removed area, or in a different area. Objects can be combined to change their shapes. The objects are put in combining mode. Two or more objects can be place together, touching each other.

The objects are fussed, joined together, where they touched, when the combing mode is exited. An object cutting tool can be used to cut, and separate an area of the visual image of the object.

A health care provider, can view and feel the inside of a patient's artery. The provider, using the avatar, can indent displayed plaque inside the artery. The provider can remove plaque, and an artery stent can be placed inside the artery. The provider can feel and view how the change to the artery effect the feel and view of the artery.

The haptic touch array creates mid-air touch that give mid-air feel shape similar to the visual 3D, mid-air hologram object's shape. The mid-air touch can also create the mass, weight feel of an object. The temperature of an object can be simulated. The movement of an object can be felt by the user.

Objects may be another user's hand, which can be shaken in mid-air, mid-air holograms creatures, 3D mid-air avatars from online player worlds. Objects can be locations, such as, 3D pyramids, Stonehenge, the Great Wall, the Moon, and Mars. Objects can be locations, such as, mid-air holograms of museum's collections, mid-air holograms of the Smithsonian or Louvre museums art, mid-air holograms from Google Earth, providing 3D mid-air views of travel destinations, and locations around the world, 3D mid-air views of medical patient's bodies, 3D views of and mid-air touch inside an engine, and moving holograms of people's faces and bodies.

Two computer avatars can interact, and exchange user data with each other. A multiple of moving avatars, such as 5 or more user's computers avatars, could be connected to each other, and can interact with each other.

The computer identifies objects viewed on the internet, in a video, or picture, by code in the object that tells the computer what the object is. For viewed objects that don't have computer code, the computer can use object recognition to identify the object, for example, the avatar touches a table, the object recognition software identifies the table, and creates a table shape. The table shape can be moved. The space left by the moved table, is filled in with visual information similar to the visual information surrounding the object.

Real time 2D, or 3D cameras and displays can be used at locations in the world, and view real world objects and people. The cameras allow to people at the location, and holographic reality users on the internet to congregate and communicate with each other. Locations where people, and holographic reality users on the internet, can go to, and meet each other, talk to each other, and can touch each other.

Holographic reality users can meet other people on the internet, and go to a café and have a coffee anywhere in the world, and communicate with people at the location they go to. The holographic reality user can have an avatar located at a location that is viewable, by other holographic reality users. The user can view the other user's avatars.

The users and their avatars can communicate with each other, using touch, visually, and audibly. The holographic reality users can communicate with people at locations, with displays, microphone, and speakers, at the locations.

Locations where people, congregate may include, cafes, bars, taverns, restaurants, outdoor café, beaches, music concert halls, sports events, libraries, lectures, and class rooms. Cameras can be placed that allow people on the internet using holographic reality headsets, and displays, to communicate with people, at locations.

The user created avatar of themselves, can be influenced by the viewed movement on the glasses on the user. The detected viewed movement of the glasses, is converted into movement of the avatar. As the user moves their avatar moves the same as the user. Other users with glasses view other people's avatars moving, over the internet. For example, a first user with glasses sends their avatar to a second user with glasses, when the first user moves the first user's avatar moves, and the avatars movements are viewed by the second user, and vice versa. The first user's avatar can also verbally specks the second user. The second user and first users interaction with each other is the same for each of the users. The users can interact visually, verbally, and tactilely each other.

Separate cameras could also be used to view each user. The images, can create an avatar. The user images, avatar and movement of the images of themselves, can be sent the other users glasses.

Holographic reality users and people at the location can interact with each other. People at the location can view holographic reality users, or the user's avatar on a display, or holographic reality headset, or holographic projection. Holographic reality users can view the people, using cameras at the location. People and the user can touch each other, using connected arrays. Users talk to each other using microphones, and speakers in the glasses. Users avatar's at cafes, can order holographic coffee and food, which can be sold by the café. Holographic tables can be set up for holographic users to sit at.

Augmented Reality using the headset, can provide a surgeon with information, which are otherwise hidden, such as showing the heartbeat rate, the blood pressure, the state of the patient's organ, and feel of the patient.

An example of holographic reality user's and people at a location could be, the user can holographic ally travel to a casino and place bets on a dice betting table. The table can be set to accommodate holographic reality players. the table can be a screen that shows where a holographic reality payer places their bets, or someone could place the bets for them. A dice throwing machine could be at the table and connected to the internet, to allow the holographic reality user to control the machine. The holographic reality traveler's face, or body and face can be shown on a display.

People can have lunch with users at different location. The users can sit at the same table, with the other user's holographic ally displayed on the glasses, display, which users at the table can view. The holographic reality user could can choose to be seen or be invisible, by other holographic reality travelers, and people at the location. The holographic reality user could throw dice using the machine. The dice machine can allow the holographic reality user to feel the dice rolling around in the dice machines hand, and be controlled by the hand movements of the holographic reality user. Similar to the feel of dice being shaken by people at the table. The holographic reality user's presence and actions at the table are the same as people at the table, except the holographic reality user's body isn't physically present.

Business meetings can be held, with people at a location, and have holographic users also participle at the meeting's location. Medical providers can operate robotic surgery machines, over the internet, performing surgery on a patient. The surgery provider can mid-air touch feel 414 the operation of the robotic hand input devices, and feel the input device's interaction with the patient's body. The provider can also hold and operate mid-air touch tools, and feel the tools, interaction with the patient's body. User can play online computer games, such as, online internet role playing games. Users can view, touch and feel touch objects, and avatars in the game.

Input devices can be created to operate different devices. One mid-air input device can be used for operating a variety for different device. The one input device can be used, which can eliminate the need for separate input devices for each device. Or the devices input control panels could be retained as a secondary back up of the universal input device.

The glasses could save space, and save learning how to operate each different devices. The glasses operation can also be described as a universal mobile input device, for operating different devices. For example, on a space station the mid-air input device can operate, the space station moving arm, and in a different input configuration, the input device can operate the station camera mover. The mid-air input can operate many devices, without the need of having two or more different input devices. The visual device can be created in holographic reality, and the physical touch input device can be created using the mid-air touch array. Almost any input device can be created holographic ally to operate one or more devices.

Holographic reality headsets 422 and mid-air touch generating transducer arrays, can be used by the user, and other users connected to the user, for the user to give, and receive sexual stimulation with other users. Visual 2014 and mid-air touch avatars 2018 can be used by the user, or computer, or another user to direct genital stimulation at the user's genitals.

Avatars can also be used by users to stimulate the other user's genitals. Users can use the avatars to engage in simultaneous genital simulation, with each other user over the internet. The transducer array can be located near the users genital's, to mid-air touch stimulate the genitals, by producing feelings similar to sexual stimulation, or other unique feelings made possible by the mid-air touch shapes.

A 3D printer can be connected the computer. The user can instruct the computer to instruct the 3D printer to print the 3D shape of the object. The printer prints the 3D shape of the object from received computer instructions. A 2D printer can be connected the computer. The user can print the 2D visual view of the object.

CONCLUSIONS, RAMIFICATIONS AND SCOPE

From the preceding description and drawings it becomes apparent that a user can use a phone, or mobile device, to operate different external devices, without touching control buttons used by other users, or control buttons on a device which may create a static electric discharge.

Other devices that a mobile device may operate, may include, hospital bed control panels, public computer terminals that use a keyboard, such as, library Keyboards, airplane toilet control panels, payphone input displays, hotel TV remote controls, hotel door lock input panels, shared workplace keyboards, and gym athletic equipment interactive display screens.

Users can visually, verbally, and tactilely interact with each other, using holographic headsets and, mid-air touch feel devices. Users can feel objects and other user's avatars in mid-air, using avatars in virtual worlds and computer games.

The advantages of the mobile device connectable to differing devices, without limitation, is an improved hygienic way to operate a device or devices.

Although the description above contains much specificity, these should not be construed as limiting the scope of the embodiments, but as merely providing illustrations, of some of the presently preferred embodiments.

Thus the reader will see that at least one embodiment, of the phone, mobile computer used to operate differing devices, provides a more reliable, healthier and economical device that can be used by persons of almost any age. Although the embodiments have been described in connection with various embodiments, it should be understood that various modifications, additions and alteration may be made to the embodiment without departing from the spirit and scope of the embodiments as defined in the appended claims.

I claim:

1. A system for operating a device on a internet, comprising:
    the device communicating over the internet to broadcast a connection request including a description of the device,
    and to generate menu information that specifies menu icons associated to functions of the device and related to the function provided by the device,
    the menu icons providing interactive control of the device by a user; and
    a portable computer having a display connected to the internet wirelessly,
    the portable computer having a portable computer location device, and the device having a device location device,
        for determining the portable computer's location and the device's location,
    the portable computer's location and device's location plotted on a map,
        for detecting when the portable computer's location is at a predetermined distance to the device on the map,
        for at the predetermined distance between the portable computer and the device connecting the portable computer to the device and sending the device's menu to the portable computer,
    and to generate the menu responsive to the user's input and allowing interacting with a plurality of the menu icons,
    a user input device connected to the portable computer,
        for receiving from the user input corresponding to one of the menu icons and sending to the device the input,
        for the device to update the menu information in response to the input,
        for the device to send to the portable computer the updated menu information,
    whereby the portable computer receives the device's menu at the predetermined distance from the device, and the device responds to user input into the device's menu.

2. The system of claim 1, wherein the device is an elevator.

3. The system of claim 1, wherein the device is a vending machine.

4. The system of claim 1, wherein the device is a light switch.

5. The system of claim 1, wherein the device is an automatic teller machine.

6. The system of claim 1, wherein the portable computer is a smart phone, and the input device is a touch input device.

7. The system of claim 1, further including the displayed menu moved to a non-displayed location in the portable computer, and displaying a short cut to the menu displayed on the display,
    for the activation of the short cut to display the menu on the display.

8. The system of claim 1, wherein the portable computer is a smart glasses, and the input device is an voice input device.

9. The system of claim 1, wherein the portable computer's wireless connection to the internet, is the portable computer having a radio wave connection to a cell phone network, and the cell phone network connected to the internet.

10. The system of claim 1, wherein the portable computer's wireless connection to the internet, is the portable computer having a WIFI radio wave connection to the internet.

11. A method for operating devices on a internet, comprising:
    broadcasting from one of the device's over the internet a request for a portable computer to operate the device,
        with the device connected the internet, with the portable computer wirelessly connected to the internet,
    automatically establishing communication between the portable computer and the device,
        with the portable computer having a portable computer location device, the device having a device location device and plotting a location of the portable computer, and a location of the device on a map, and establishing communication between the portable computer and the device when the portable computer and the device are at a predetermined distance from each other on the map, sending to the portable computer from the device a user menu that specifies user menu icons related to the device's functions, and the user menu icons providing interactive control of the device;

receiving by the device from the portable computer user input associated with one of the user menu icons, with a user input device connected to the portable computer, updating the user menu information in response to the input, sending to the portable computer the updated user menu information.

12. The method of claim 11, wherein the device is a store checkout payment device.

13. The method of claim 11, wherein the device is a gas pump.

14. The method of claim 11, wherein the device is a user interactive kiosk.

15. The method of claim 11, wherein the portable computer is a smart phone, and the input device is a touch input device.

16. The method of claim 11, wherein the portable computer is an augmented reality headset, and the user input device is a voice input device.

17. The method of claim 11, wherein the portable computer is an augmented reality headset, and the user input device is a hand gesture input device, for the user to use hand gestures to input into the augmented reality headset display, and avoid touching possibly harmful bacteria on the device's touch input buttons.

18. The method of claim 11, further providing moving the displayed to a non-displayed location in the portable computer, and displaying a short cut to the menu displayed on the display, for the activation of the short cut to display the menu on the display.

19. The method of claim 11, wherein the portable computer's wireless connection to the internet, is the portable computer having a radio wave connection to a cell phone network, and the cell phone network connected to the internet.

20. The method of claim 11, wherein the portable computer's wireless connection to the internet, is the portable computer having a WIFI radio wave connection to the internet.

* * * * *